US011099513B2

(12) United States Patent
Nogawa et al.

(10) Patent No.: US 11,099,513 B2
(45) Date of Patent: Aug. 24, 2021

(54) COMMUNICATION DEVICE OUTPUTTING INFORMATION ON A PLURALITY OF PRINTING DEVICES THAT EXECUTE PRINTING OPERATIONS USING PRINTING AGENT ACCOMMODATED IN CARTRIDGE

(71) Applicant: BROTHER KOGYO KABUSHIKI KAISHA, Nagoya (JP)

(72) Inventors: Hideki Nogawa, Nagoya (JP); Masafumi Miyazawa, Nagoya (JP); Akiko Mizuno, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 16/926,960

(22) Filed: Jul. 13, 2020

(65) Prior Publication Data

US 2020/0341421 A1 Oct. 29, 2020

Related U.S. Application Data

(63) Continuation of application No. 16/371,791, filed on Apr. 1, 2019, now Pat. No. 10,712,701.

(30) Foreign Application Priority Data

May 10, 2018 (JP) .............................. JP2018-091391

(51) Int. Cl.
*G03G 15/00* (2006.01)
*G06F 3/12* (2006.01)

(52) U.S. Cl.
CPC ........... *G03G 15/553* (2013.01); *G06F 3/126* (2013.01); *G06F 3/1219* (2013.01); *G06F 3/1286* (2013.01)

(58) Field of Classification Search
CPC .... B41J 2/17566; B41J 2/175; B41J 2/17553; B41J 2/1752; B41J 29/38;
(Continued)

(56) References Cited

U.S. PATENT DOCUMENTS

2012/0081479 A1 4/2012 Itogawa
2012/0268507 A1 10/2012 Asami
(Continued)

FOREIGN PATENT DOCUMENTS

JP 2016-48501 A 4/2016

*Primary Examiner* — Jannelle M Lebron
(74) *Attorney, Agent, or Firm* — Merchant & Gould P.C.

(57) ABSTRACT

In a communication device, a processor identifies first and second group printing devices in accordance with device information on each printing device, and outputs device information corresponding to the first and second group printing devices in a distinguishable manner. A printing device having a tank accommodating printing agent greater than or equal to a first reference is identified as the first and second group printing devices. A printing device having a tank accommodating printing agent less than the first reference is identified as the second group printing device. A printing device without tank and in which a cartridge accommodating printing agent less than a second reference and greater than or equal to a third reference is identified as the first group printing device. A printing device without tank and in which the cartridge accommodating printing agent less than the third reference is identified as the second group printing device.

14 Claims, 17 Drawing Sheets

(58) Field of Classification Search
CPC .......... B41J 2002/17589; B41J 29/393; G03G 15/556; G03G 15/553; G06F 3/1219; G06F 3/1229; G06F 3/1235; G06F 3/126; G06F 3/1286; G06F 3/1296
See application file for complete search history.

(56) References Cited

U.S. PATENT DOCUMENTS

2016/0062293 A1   3/2016  Nakamura et al.
2017/0217196 A1*  8/2017  Kon ..................... B41J 2/17553

* cited by examiner

FIRST RESIDUAL CONDITION S1

SECOND RESIDUAL CONDITION S2

THIRD RESIDUAL CONDITION S3

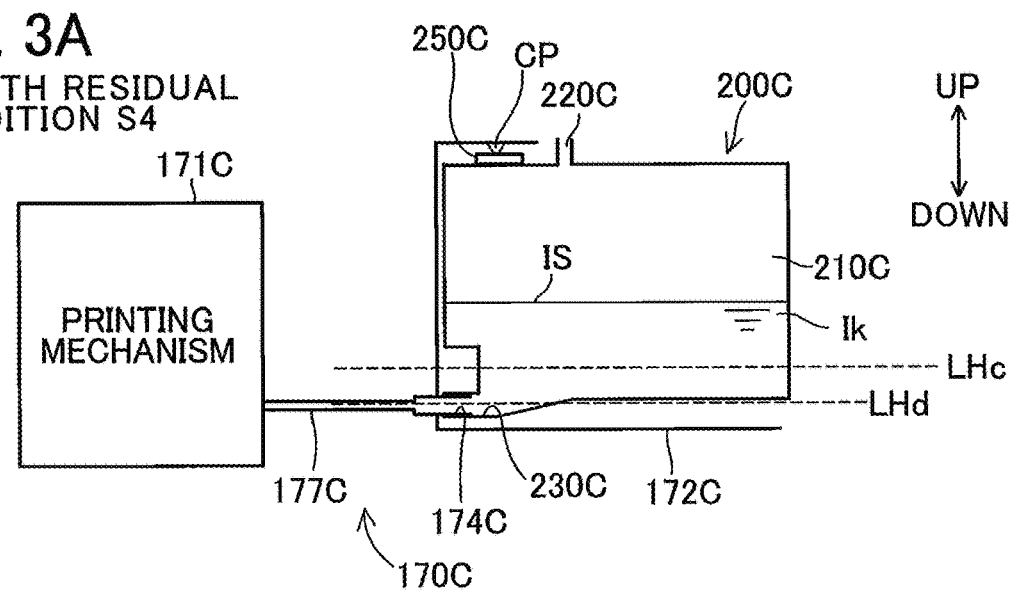
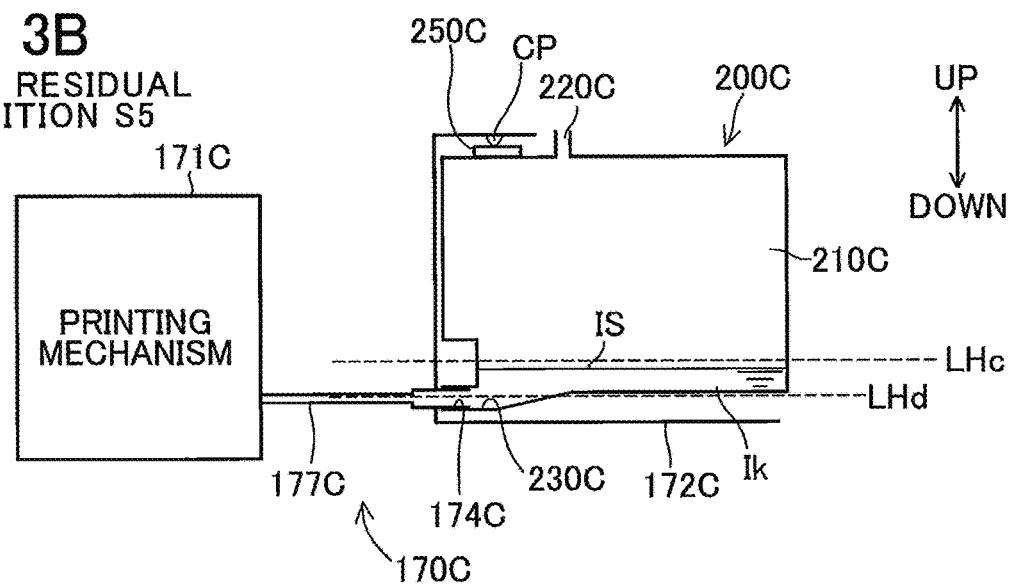
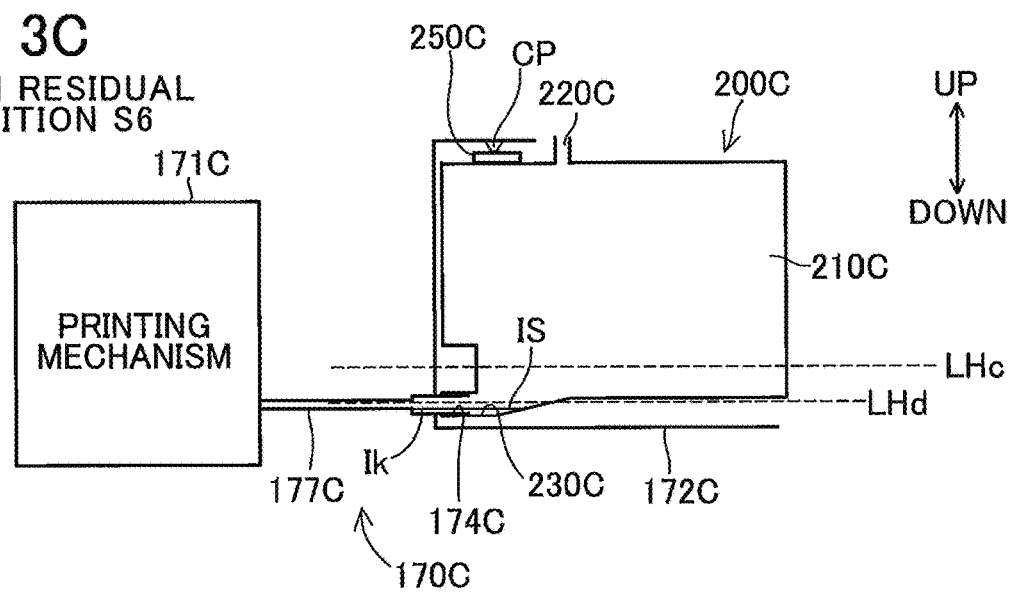

FIG. 4

| | SERIAL NUMBER | MODEL NAME | IP ADDRESS | SUPPLY SYSTEM | BOUNDARY INK VOLUME BV | C INK | | | M INK | | |
|---|---|---|---|---|---|---|---|---|---|---|---|
| | | | | | | RESIDUAL INK VOLUME RV | REMAINING DAYS RD | RESIDUAL STATE | RESIDUAL INK VOLUME RV | REMAINING DAYS RD | RESIDUAL STATE |
| EN1 | AAABBB | Dev_1 | IP_A | DOUBLE CHAMBER | 400 | 6000 | 15 DAYS | NORMAL | 300 | 2 DAYS | LOW |
| EN2 | CCCDDD | Dev_2 | IP_B | DOUBLE CHAMBER | 400 | 250 | 2 DAYS | LOW | 2000 | 10 DAYS | NORMAL |
| EN3 | GGGHHH | Dev_3 | IP_C | SINGLE CHAMBER | | 30 | 0 DAYS | OUT | 1000 | 5 DAYS | NORMAL |

FILTER [ ALL ▼ ] PMa   SORT [ — ▼ ] PMb   ⤺ MLO

| MODEL NAME | SUPPLY SYSTEM | C RESIDUAL STATE | C REMAINING DAYS | M RESIDUAL STATE | M REMAINING DAYS | Y RESIDUAL STATE | Y REMAINING DAYS | K RESIDUAL STATE | K REMAINING DAYS |
|---|---|---|---|---|---|---|---|---|---|
| Dev_1 | DOUBLE CHAMBER | NORMAL | 15 | NORMAL | 6 | NORMAL | 8 | NORMAL | 11 |
| Dev_2 | DOUBLE CHAMBER | LOW | 2 | NORMAL | 15 | NORMAL | 6 | NORMAL | 9 |
| Dev_3 | SINGLE CHAMBER | OUT | 0 | NORMAL | 8 | NORMAL | 12 | NORMAL | 6 |
| Dev_4 | DOUBLE CHAMBER | NORMAL | 9 | OUT | 9 | LOW | 4 | NORMAL | 13 |
| Dev_5 | DOUBLE CHAMBER | NORMAL | 6 | NORMAL | 0 | NORMAL | 15 | OUT | 0 |
| Dev_6 | SINGLE CHAMBER | NORMAL | 7 | NORMAL | 9 | NORMAL | 6 | LOW | 3 |
| Dev_7 | SINGLE CHAMBER | NORMAL | 8 | NORMAL | 8 | NORMAL | 6 | NORMAL | 9 |

FIG. 7B

FILTER [ORDER] (PMa)  SORT [—] (PMb)

ML1

| MODEL NAME | SUPPLY SYSTEM | C RESIDUAL STATE | C REMAINING DAYS | M RESIDUAL STATE | M REMAINING DAYS | Y RESIDUAL STATE | Y REMAINING DAYS | K RESIDUAL STATE | K REMAINING DAYS |
|---|---|---|---|---|---|---|---|---|---|
| Dev_2 | DOUBLE CHAMBER | LOW | 2 | NORMAL | 15 | NORMAL | 6 | NORMAL | 9 |
| Dev_4 | DOUBLE CHAMBER | NORMAL | 9 | NORMAL | 9 | LOW | 4 | NORMAL | 13 |
| Dev_6 | SINGLE CHAMBER | NORMAL | 7 | NORMAL | 9 | NORMAL | 6 | LOW | 3 |

FIG. 7C

FILTER [REPLACE] (PMa)  SORT [—] (PMb)

ML2

| MODEL NAME | SUPPLY SYSTEM | C RESIDUAL STATE | C REMAINING DAYS | M RESIDUAL STATE | M REMAINING DAYS | Y RESIDUAL STATE | Y REMAINING DAYS | K RESIDUAL STATE | K REMAINING DAYS |
|---|---|---|---|---|---|---|---|---|---|
| Dev_2 | DOUBLE CHAMBER | LOW | 2 | NORMAL | 15 | NORMAL | 6 | NORMAL | 9 |
| Dev_3 | SINGLE CHAMBER | OUT | 0 | NORMAL | 8 | NORMAL | 12 | NORMAL | 6 |
| Dev_4 | DOUBLE CHAMBER | NORMAL | 9 | NORMAL | 9 | LOW | 4 | NORMAL | 13 |
| Dev_5 | DOUBLE CHAMBER | NORMAL | 6 | OUT | 0 | NORMAL | 15 | OUT | 0 |

FIG. 7D

FILTER [ ALL ]   SORT [ INK QTY (TOTAL) ▼ ]
                         PMa              PMb          ML3

| MODEL NAME | SUPPLY SYSTEM | C RESIDUAL STATE | C REMAINING DAYS | M RESIDUAL STATE | M REMAINING DAYS | Y RESIDUAL STATE | Y REMAINING DAYS | K RESIDUAL STATE | K REMAINING DAYS |
|---|---|---|---|---|---|---|---|---|---|
| Dev_5 | DOUBLE CHAMBER | NORMAL | 6 | OUT | 0 | NORMAL | 15 | OUT | 0 |
| Dev_3 | SINGLE CHAMBER | OUT | 0 | NORMAL | 8 | NORMAL | 12 | NORMAL | 6 |
| Dev_2 | DOUBLE CHAMBER | LOW | 2 | NORMAL | 15 | NORMAL | 6 | NORMAL | 9 |
| Dev_4 | DOUBLE CHAMBER | NORMAL | 9 | NORMAL | 9 | LOW | 4 | NORMAL | 13 |
| Dev_6 | SINGLE CHAMBER | NORMAL | 7 | NORMAL | 8 | NORMAL | 6 | LOW | 3 |
| Dev_7 | SINGLE CHAMBER | NORMAL | 8 | NORMAL | 6 | NORMAL | 6 | NORMAL | 9 |
| Dev_1 | DOUBLE CHAMBER | NORMAL | 15 | NORMAL | 6 | NORMAL | 8 | NORMAL | 11 |

FIG. 10A

FILTER [ALL ▼]PMa   SORT [— ]▼PMb   ←ML0

| MODEL NAME | SUPPLY SYSTEM | C RESIDUAL STATE | C REMAINING DAYS | M RESIDUAL STATE | M REMAINING DAYS | Y RESIDUAL STATE | Y REMAINING DAYS | K RESIDUAL STATE | K REMAINING DAYS |
|---|---|---|---|---|---|---|---|---|---|
| Dev_1 | DOUBLE CHAMBER | LOW | 4 | NORMAL | 6 | NORMAL | 8 | NORMAL | 11 |
| Dev_2 | DOUBLE CHAMBER | NORMAL | 8 | NORMAL | 15 | LOW | 3 | NORMAL | 9 |
| Dev_3 | SINGLE CHAMBER | NORMAL | 10 | NORMAL | 8 | OUT | 0 | NORMAL | 6 |
| Dev_4 | DOUBLE CHAMBER | LOW | 3 | OUT | 9 | LOW | 4 | NORMAL | 13 |
| Dev_5 | DOUBLE CHAMBER | NORMAL | 6 | NORMAL | 0 | NORMAL | 15 | OUT | 0 |
| Dev_6 | SINGLE CHAMBER | LOW | 3 | NORMAL | 9 | LOW | 1 | LOW | 3 |
| Dev_7 | SINGLE CHAMBER | LOW | 2 | NORMAL | 8 | LOW | 3 | NORMAL | 9 |

FIG. 10B

FILTER: ALL (PMa)    SORT: C INK QTY (PMb)    ML4

| MODEL NAME | SUPPLY SYSTEM | C RESIDUAL STATE | C REMAINING DAYS | M RESIDUAL STATE | M REMAINING DAYS | Y RESIDUAL STATE | Y REMAINING DAYS | K RESIDUAL STATE | K REMAINING DAYS |
|---|---|---|---|---|---|---|---|---|---|
| Dev_4 | DOUBLE CHAMBER | LOW | 3 | NORMAL | 9 | LOW | 4 | NORMAL | 13 |
| Dev_1 | DOUBLE CHAMBER | LOW | 4 | NORMAL | 6 | NORMAL | 8 | NORMAL | 11 |
| Dev_7 | SINGLE CHAMBER | LOW | 2 | NORMAL | 8 | LOW | 3 | NORMAL | 9 |
| Dev_6 | SINGLE CHAMBER | LOW | 3 | OUT | 0 | LOW | 1 | LOW | 3 |
| Dev_5 | DOUBLE CHAMBER | NORMAL | 6 | NORMAL | 15 | NORMAL | 15 | OUT | 0 |
| Dev_2 | DOUBLE CHAMBER | NORMAL | 8 | NORMAL | 8 | LOW | 3 | NORMAL | 9 |
| Dev_3 | SINGLE CHAMBER | NORMAL | 10 | NORMAL | — | OUT | 0 | NORMAL | 6 |

FIG. 10C

| MODEL NAME | SUPPLY SYSTEM | C | | M | | Y | | K | |
|---|---|---|---|---|---|---|---|---|---|
| | | RESIDUAL STATE | REMAINING DAYS | RESIDUAL STATE | REMAINING DAYS | RESIDUAL STATE | REMAINING DAYS | RESIDUAL STATE | REMAINING DAYS |
| Dev_3 | SINGLE CHAMBER | NORMAL | 10 | NORMAL | 8 | OUT | 0 | NORMAL | 6 |
| Dev_2 | DOUBLE CHAMBER | NORMAL | 8 | NORMAL | 15 | LOW | 3 | NORMAL | 9 |
| Dev_4 | DOUBLE CHAMBER | LOW | 3 | NORMAL | 9 | LOW | 4 | NORMAL | 13 |
| Dev_6 | SINGLE CHAMBER | LOW | 3 | NORMAL | 9 | LOW | 1 | LOW | 3 |
| Dev_7 | SINGLE CHAMBER | LOW | 2 | NORMAL | 8 | LOW | 3 | NORMAL | 9 |
| Dev_1 | DOUBLE CHAMBER | LOW | 4 | NORMAL | 6 | NORMAL | 8 | NORMAL | 11 |
| Dev_5 | DOUBLE CHAMBER | NORMAL | 6 | OUT | 0 | NORMAL | 15 | OUT | 0 |

FILTER [ ALL ] ▼ PMa    SORT [ Y INK QTY ] ▼ PMb    ML5

FIG. 11A

FILTER [ ALL ▼ ] PMa  SORT [ — ▼ ] PMb  ML0

| MODEL NAME | SUPPLY SYSTEM | C | | M | | Y | | K | |
|---|---|---|---|---|---|---|---|---|---|
| | | RESIDUAL STATE | REMAINING DAYS | RESIDUAL STATE | REMAINING DAYS | RESIDUAL STATE | REMAINING DAYS | RESIDUAL STATE | REMAINING DAYS |
| Dev_1 | DOUBLE CHAMBER | LOW | 4 | NORMAL | 6 | NORMAL | 8 | NORMAL | 11 |
| Dev_2 | DOUBLE CHAMBER | NORMAL | 8 | NORMAL | 15 | LOW | 3 | NORMAL | 9 |
| Dev_3 | SINGLE CHAMBER | NORMAL | 10 | NORMAL | 8 | OUT | 0 | NORMAL | 6 |
| Dev_4 | DOUBLE CHAMBER | LOW | 3 | OUT | 0 | LOW | 4 | NORMAL | 13 |
| Dev_5 | DOUBLE CHAMBER | NORMAL | 6 | NORMAL | 9 | NORMAL | 15 | OUT | 0 |
| Dev_6 | SINGLE CHAMBER | LOW | 3 | NORMAL | 9 | LOW | 1 | LOW | 3 |
| Dev_7 | SINGLE CHAMBER | LOW | 2 | NORMAL | 8 | LOW | 3 | NORMAL | 9 |

FIG. 11B

FILTER [ ALL ▼ ] PMa  SORT [ C INK QTY ▼ ] PMb  ML6

| MODEL NAME | SUPPLY SYSTEM | C RESIDUAL STATE | C REMAINING DAYS | M RESIDUAL STATE | M REMAINING DAYS | Y RESIDUAL STATE | Y REMAINING DAYS | K RESIDUAL STATE | K REMAINING DAYS |
|---|---|---|---|---|---|---|---|---|---|
| Dev_7 | SINGLE CHAMBER | LOW | 2 | NORMAL | 8 | LOW | 3 | NORMAL | 9 |
| Dev_4 | DOUBLE CHAMBER | LOW | 3 | NORMAL | 9 | LOW | 4 | NORMAL | 13 |
| Dev_1 | DOUBLE CHAMBER | LOW | 4 | NORMAL | 6 | NORMAL | 8 | NORMAL | 11 |
| Dev_6 | SINGLE CHAMBER | LOW | 3 | NORMAL | 9 | LOW | 1 | LOW | 3 |
| Dev_5 | DOUBLE CHAMBER | NORMAL | 6 | OUT | 0 | NORMAL | 15 | OUT | 0 |
| Dev_2 | DOUBLE CHAMBER | NORMAL | 8 | NORMAL | 15 | LOW | 3 | NORMAL | 9 |
| Dev_3 | SINGLE CHAMBER | NORMAL | 10 | NORMAL | 8 | OUT | 0 | NORMAL | 6 |

FIG. 11C

| MODEL NAME | SUPPLY SYSTEM | C | | M | | Y | | K | |
|---|---|---|---|---|---|---|---|---|---|
| | | RESIDUAL STATE | REMAINING DAYS | RESIDUAL STATE | REMAINING DAYS | RESIDUAL STATE | REMAINING DAYS | RESIDUAL STATE | REMAINING DAYS |
| Dev_3 | SINGLE CHAMBER | NORMAL | 10 | NORMAL | 8 | OUT | 0 | NORMAL | 6 |
| Dev_6 | SINGLE CHAMBER | LOW | 3 | NORMAL | 9 | LOW | 1 | LOW | 3 |
| Dev_2 | DOUBLE CHAMBER | NORMAL | 8 | NORMAL | 15 | LOW | 3 | NORMAL | 9 |
| Dev_4 | DOUBLE CHAMBER | LOW | 3 | NORMAL | 9 | LOW | 4 | NORMAL | 13 |
| Dev_7 | SINGLE CHAMBER | LOW | 2 | NORMAL | 8 | LOW | 3 | NORMAL | 9 |
| Dev_1 | DOUBLE CHAMBER | LOW | 4 | NORMAL | 6 | NORMAL | 8 | NORMAL | 11 |
| Dev_5 | DOUBLE CHAMBER | NORMAL | 6 | OUT | 0 | NORMAL | 15 | OUT | 0 |

FILTER ALL ▶ PMa    SORT Y INK QTY ▶ PMb    ML7

FIG. 12

MANAGEMENT LIST WB

ORDER GROUP LIST ML1

| MODEL NAME | SUPPLY SYSTEM | C RESIDUAL STATE | C REMAINING DAYS | M RESIDUAL STATE | M REMAINING DAYS | Y RESIDUAL STATE | Y REMAINING DAYS | K RESIDUAL STATE | K REMAINING DAYS |
|---|---|---|---|---|---|---|---|---|---|
| Dev_2 | DOUBLE CHAMBER | LOW | 2 | NORMAL | 15 | NORMAL | 6 | NORMAL | 9 |
| Dev_4 | DOUBLE CHAMBER | NORMAL | 9 | NORMAL | 9 | LOW | 4 | NORMAL | 13 |
| Dev_6 | SINGLE CHAMBER | NORMAL | 7 | NORMAL | 9 | NORMAL | 6 | LOW | 3 |

REPLACE GROUP LIST ML2

| MODEL NAME | SUPPLY SYSTEM | C RESIDUAL STATE | C REMAINING DAYS | M RESIDUAL STATE | M REMAINING DAYS | Y RESIDUAL STATE | Y REMAINING DAYS | K RESIDUAL STATE | K REMAINING DAYS |
|---|---|---|---|---|---|---|---|---|---|
| Dev_2 | DOUBLE CHAMBER | LOW | 2 | NORMAL | 15 | NORMAL | 6 | NORMAL | 9 |
| Dev_3 | SINGLE CHAMBER | OUT | 0 | NORMAL | 8 | LOW | 12 | NORMAL | 6 |
| Dev_4 | DOUBLE CHAMBER | NORMAL | 9 | NORMAL | 9 | LOW | 4 | NORMAL | 13 |
| Dev_5 | DOUBLE CHAMBER | NORMAL | 6 | OUT | 0 | NORMAL | 15 | OUT | 0 |

//COMMUNICATION DEVICE OUTPUTTING INFORMATION ON A PLURALITY OF PRINTING DEVICES THAT EXECUTE PRINTING OPERATIONS USING PRINTING AGENT ACCOMMODATED IN CARTRIDGE

CROSS REFERENCE TO RELATED APPLICATION

This application is a continuation of U.S. patent application Ser. No. 16/371,791, filed Apr. 1, 2019, and further claims priority from Japanese Patent Application No. 2018-091391 filed May 10, 2018. The entire contents of both application are incorporated herein by reference.

TECHNICAL FIELD

The present disclosure relates to a technique for outputting information on a plurality of printing devices that execute printing operations using printing agent accommodated in a cartridge.

BACKGROUND

A management server that manages a plurality of printing devices using toner is well known in the art. The management server predicts the timing at which toner must be replenished in each printing device. When a plurality of printing devices need toner replenished at the same timing, the management server supplies the toner for the plurality of printing devices all at once.

SUMMARY

However, the conventional technology does not sufficiently consider cases in which the printing devices under management are of different types. Consequently, the potential for difficulties has existed in the management of printing agent for printing devices that include different types of printing devices.

In view of the foregoing it is an object of the present disclosure to provide a technique for facilitating the management of printing agent in a plurality of printing devices that include a plurality of types of printing devices.

In order to attain the above and other objects, the present disclosure provides a communication device capable of communicating with a plurality of printing devices. The plurality of printing devices includes a first printing device and a second printing device. The first printing device includes: a first mounting portion; a tank; and a first printing portion. A first cartridge accommodates printing agent. The first cartridge is mounted in the first mounting portion. The tank is configured to accommodate printing agent supplied from the first cartridge. The first printing portion is configured to execute printing operations using printing agent supplied from the tank. The second printing device includes: a second mounting portion; and a second printing portion. A second cartridge accommodates printing agent. The second cartridge is mounted in the second mounting portion. The second printing portion is configured to execute printing operations using printing agent supplied from the second cartridge. The second printing device has no tank between the second mounting portion and the second printing portion. The communication device includes a processor. The processor is configured to perform: (a) acquiring; (b) identifying; and (c) outputting. The (a) acquiring acquires a plurality of sets of device information on respective ones of the plurality of printing devices. The plurality of sets of device information includes first device information corresponding to the first printing device and second device information corresponding to the second printing device. The first device information indicates a first residual state of printing agent in the first printing device. The first residual state is classified into a first condition, a second condition, and a third condition. The first condition indicates that the first cartridge and the tank accommodate printing agent. The second condition indicates that the first cartridge is out of printing agent while the tank accommodates printing agent greater than or equal to a first reference quantity. The third condition indicates that the first cartridge is out of printing agent and the tank accommodates printing agent less than the first reference quantity. The second device information indicates a second residual state of printing agent in the second printing device. The second residual state is classified into a fourth condition, a fifth condition, and a sixth condition. The fourth condition indicates that the second cartridge accommodates printing agent greater than or equal to a second reference quantity. The fifth condition indicates that the second cartridge accommodates printing agent less than the second reference quantity and greater than or equal to a third reference quantity smaller than the second reference quantity. The sixth condition indicates that the second cartridge accommodates printing agent less than the third reference quantity. The (b) identifying identifies a first group printing device belonging to a first group and a second group printing device belonging to a second group in accordance with the plurality of sets of device information. The first group printing device and the second group printing device are identified from among the plurality of printing devices. The (c) outputting outputs device information corresponding to the first group printing device and device information corresponding to the second group printing device in a distinguishable manner. The (b) identifying identifies the first printing device in the second condition and the second printing device in the fifth condition as the first group printing device. The (b) identifying identifies the first printing device in the second condition, the first printing device in the third condition, and the second printing device in the sixth condition as the second group printing device.

According to another aspect, the present disclosure provides a method for outputting plurality of sets of device information on a plurality of printing devices. The plurality of printing devices includes a first printing device and a second printing device. The first printing device includes: a first mounting portion; a tank; and a first printing portion. A first cartridge accommodates printing agent. The first cartridge is mounted in the first mounting portion. The tank is configured to accommodate printing agent supplied from the first cartridge. The first printing portion is configured to execute printing operations using printing agent supplied from the tank. The second printing device includes: a second mounting portion; and a second printing portion. A second cartridge accommodates printing agent. The second cartridge is mounted in the second mounting portion. The second printing portion is configured to execute printing operations using printing agent supplied from the second cartridge. The second printing device has no tank between the second mounting portion and the second printing portion. The method includes: (a) acquiring; (b) identifying; and (c) outputting. The (a) acquiring acquires a plurality of sets of device information on respective ones of the plurality of printing devices. The plurality of sets of device information includes first device information corresponding to the first printing device and second device information corresponding to the second printing device. The first device information indicates a first residual state of printing agent in the first printing device. The first residual state is classified into a first condition, a second condition, and a third condition. The first condition indicates that the first cartridge and the tank accommodate printing agent. The second condition indicates that the first cartridge is out of printing agent while the tank accommodates printing agent greater than or equal to a first reference quantity. The third condition indicates that the first cartridge is out of printing agent and the tank accommodates printing agent less than the first reference quantity. The second device information indicates a second residual state of printing agent in the second printing device. The second residual state is classified into a fourth condition, a fifth condition, and a sixth condition. The fourth condition indicates that the second cartridge accommodates printing agent greater than or equal to a second reference quantity. The fifth condition indicates that the second cartridge accommodates printing agent less than the second reference quantity and greater than or equal to a third reference quantity smaller than the second reference quantity. The sixth condition indicates that the second cartridge accommodates printing agent less than the third reference quantity. The (b) identifying identifies a first group printing device belonging to a first group and a second group printing device belonging to a second group in accordance with the plurality of sets of device information. The first group printing device and the second group printing device are identified from among the plurality of printing devices. The (c) outputting outputs device information corresponding to the first group printing device and device information corresponding to the second group printing device in a distinguishable manner. The (b) identifying identifies the first printing device in the second condition and the second printing device in the fifth condition as the first group printing device. The (b) identifying identifies the first printing device in the second condition, the first printing device in the third condition, and the second printing device in the sixth condition as the second group printing device.

According to still another aspect, the present disclosure provides a non-transitory computer readable storage medium storing a set of program instructions. The set of program instructions is installed on and executed by a computer. The computer is capable of communicating with a plurality of printing devices. The plurality of printing devices includes a first printing device and a second printing device. The first printing device includes: a first mounting portion; a tank; and a first printing portion. A first cartridge accommodates printing agent. The first cartridge is mounted in the first mounting portion. The tank is configured to accommodate printing agent supplied from the first cartridge. The first printing portion is configured to execute printing operations using printing agent supplied from the tank. The second printing device includes: a second mounting portion; and a second printing portion. A second cartridge accommodates printing agent. The second cartridge is mounted in the second mounting portion. The second printing portion is configured to execute printing operations using printing agent supplied from the second cartridge. The second printing device has no tank between the second mounting portion and the second printing portion. The set of program instructions includes: (a) acquiring; (b) identifying; and (c) outputting. The (a) acquiring acquires a plurality of sets of device information on respective ones of the plurality of printing devices. The plurality of sets of device information including first device information corresponding to the first printing device and second device information corresponding to the second printing device. The first device information indicates a first residual state of printing agent in the first printing device. The first residual state is classified into a first condition, a second condition, and a third condition. The first condition indicates that the first cartridge and the tank accommodate printing agent. The second condition indicates that the first cartridge is out of printing agent while the tank accommodates printing agent greater than or equal to a first reference quantity. The third condition indicates that the first cartridge is out of printing agent and the tank accommodates printing agent less than the first reference quantity. The second device information indicates a second residual state of printing agent in the second printing device. The second residual state is classified into a fourth condition, a fifth condition, and a sixth condition. The fourth condition indicates that the second cartridge accommodates printing agent greater than or equal to a second reference quantity. The fifth condition indicates that the second cartridge accommodates printing agent less than the second reference quantity and greater than or equal to a third reference quantity smaller than the second reference quantity. The sixth condition indicates that the second cartridge accommodates printing agent less than the third reference quantity. The (b) identifying identifies a first group printing device belonging to a first group and a second group printing device belonging to a second group in accordance with the plurality of sets of device information. The first group printing device and the second group printing device are identified from among the plurality of printing devices. The (c) outputting outputs device information corresponding to the first group printing device and device information corresponding to the second group printing device in a distinguishable manner. The (b) identifying identifies the first printing device in the second condition and the second printing device in the fifth condition as the first group printing device. The (b) identifying identifies the first printing device in the second condition, the first printing device in the third condition, and the second printing device in the sixth condition as the second group printing device.

BRIEF DESCRIPTION OF THE DRAWINGS

The particular features and advantages of the disclosure as well as other objects will become apparent from the following description taken in connection with the accompanying drawings, in which:

FIG. 3A is a schematic diagram illustrating a structure of a print executing unit of a printer having a single-chamber supply system and constituting the system according to the first embodiment, and particularly illustrating a fourth residual condition of ink in an ink cartridge mounted in the print executing unit;

FIG. 3B is a schematic diagram illustrating the structure of the print executing unit of the printer having the single-chamber supply system and constituting the system according to the first embodiment, and particularly illustrating a fifth residual condition of ink in the ink cartridge mounted in the print executing unit;

FIG. 3C is a schematic diagram illustrating the structure of the print executing unit of the printer having the single-chamber supply system and constituting the system according to the first embodiment, and particularly illustrating a sixth residual condition of ink in the ink cartridge mounted in the print executing unit;

FIG. 4 is a table illustrating an example of a management database of a management server constituting the system according to the first embodiment;

FIG. 7A is an explanatory diagram illustrating one example of a management list according to the first embodiment and particularly illustrating an example of an initial list;

FIG. 7B is an explanatory diagram illustrating the one example of the management list according to the first embodiment and particularly illustrating an example of an order group list;

FIG. 7C is an explanatory diagram illustrating the one example of the management list according to the first embodiment and particularly illustrating an example of a replace group;

FIG. 7D is an explanatory diagram illustrating the one example of the management list according to the first embodiment and particularly illustrating an example of a sorted list sorted according to a total quantity of ink for four colors;

FIG. 10A is an explanatory diagram illustrating another example of the management list according to the first embodiment and particularly illustrating another example of the initial list;

FIG. 10B is an explanatory diagram illustrating the other example of the management list according to the first embodiment and particularly illustrating an example of a sorted list sorted according to a quantity of C ink;

FIG. 10C is an explanatory diagram illustrating the other example of the management list according to the first embodiment and particularly illustrating an example of a sorted list sorted according to a quantity of Y ink;

FIG. 11A is an explanatory diagram illustrating one example of the management list according to a second embodiment and particularly illustrating an example of an initial list;

FIG. 11B is an explanatory diagram illustrating the one example of the management list according to the second embodiment and particularly illustrating an example of a sorted list sorted according to a quantity of C ink in a case where a reference number of days is two days;

FIG. 11C is an explanatory diagram illustrating the example of the management list according to the second embodiment and particularly illustrating an example of a sorted list sorted according to a quantity of Y ink in the case where the reference number of days is two days; and FIG. 12 is an explanatory diagram illustrating an example of a display screen according to a variation.

DETAILED DESCRIPTION

A. First Embodiment

A-1. Structure of a System 1000

Figure 1:
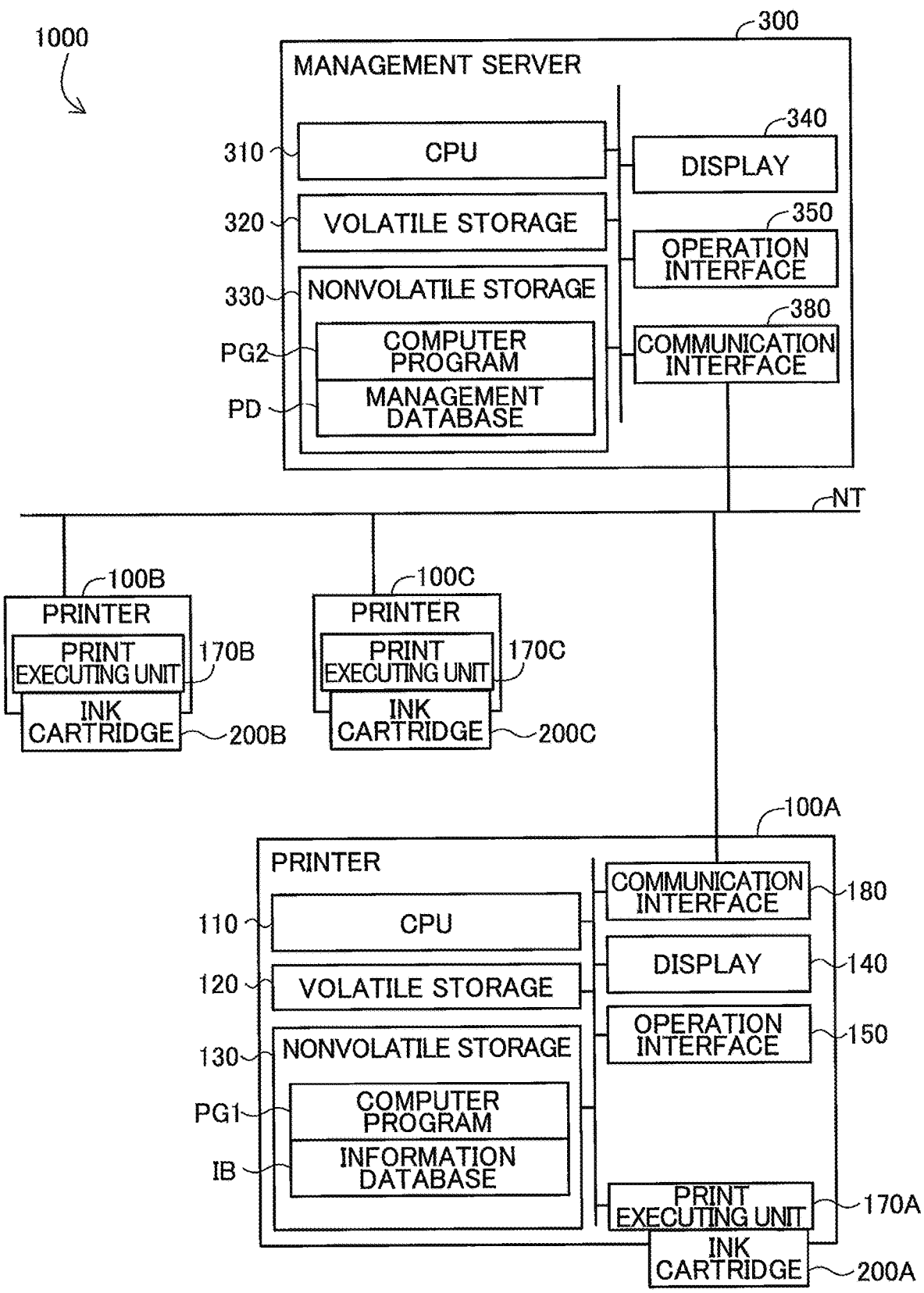
FIG. 1 is a block diagram illustrating a structure of a system according to a first embodiment of the present disclosure.

FIG. 1 is a block diagram illustrating the structure of a system 1000. The system 1000 is provided with a plurality of printers including printers 100A, 100B, and 100C, and a management server 300 as an example of the communication device of the present disclosure. FIG. 1 illustrates only the printers 100A, 100B, and 100C among the plurality of printers constituting the system 1000 for the purpose of avoiding complication of the drawing. The printers including the printers 100A, 100B, and 100C and the management server 300 are connected to a local area network NT and can communicate with each other over the local area network NT.

The printer 100A includes a central processing unit (CPU) 110 constituting a controller of the printer 100A; a volatile storage 120, such as a dynamic random access memory (DRAM); a nonvolatile storage 30, such as a hard disk drive or a flash memory; a display 140, such as a liquid crystal display that displays images; an operation interface 150, such as a touchscreen and buttons designed to acquire operations performed by the user; a print executing unit 170A; and a communication interface 180.

The communication interface 180 is configured to be in connection with the local area network NT. Specifically, the communication interface 180 is a wired interface conforming to Ethernet (registered trademark), or a wireless interface conforming to the Wi-Fi technology (based on the IEEE (Institute of Electrical and Electronics Engineers, Inc.) 802.11 standard or a standard based on this standard, such as one of the versions 802.11a, 11b, 11g, and 11n).

The CPU 110 is a processor that performs data processing. The volatile storage 120 provides a buffer region that temporarily stores various intermediate data generated when the CPU 110 performs processes. The nonvolatile storage 130 stores a computer program PG1 for controlling the printer 100A, and an information database IB described later.

In the present embodiment, the computer program PG1 may be pre-stored in the nonvolatile storage 130 when the printer 100A is manufactured. Alternatively, the computer program PG1 may be made available through download from a server connected to the printer 100A over the internet, or may be provided in a recorded format, such as on a compact disc read only memory (CD-ROM).

By executing the computer program PG1, the CPU 110 executes a printing process for controlling the print executing unit 170A to print images. Also, by executing the computer program PG1, the CPU 110 transmits to the management server 300 various printer information, which is related to the printer 100A and is stored in the information database IB, in response to a request from the management server 300.

Figure 2A:
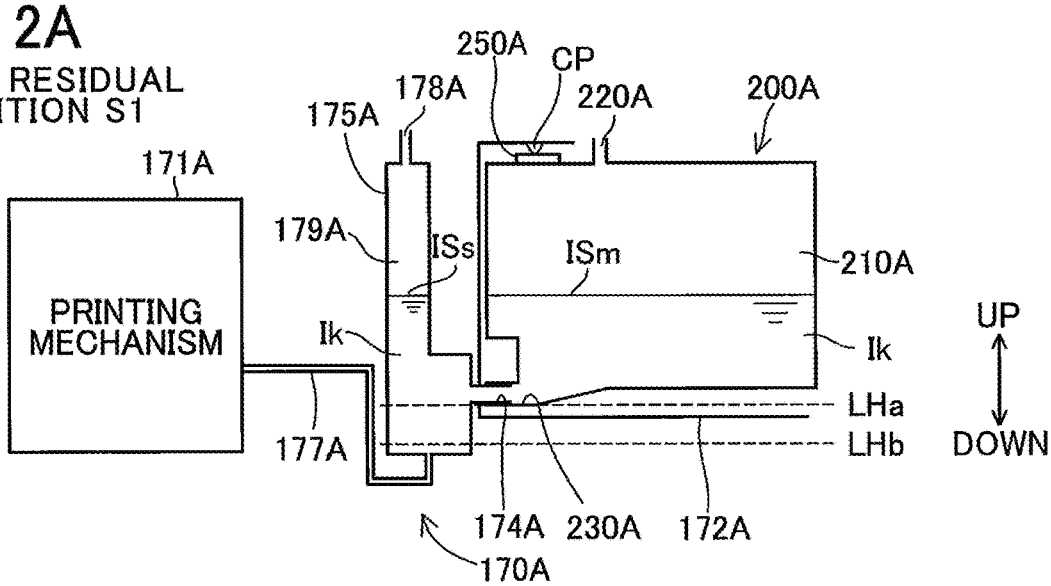
FIG. 2A is a schematic diagram illustrating a structure of a print executing unit of a printer having a double-chamber supply system and constituting the system according to the first embodiment, and particularly illustrating a first residual condition of ink in an ink cartridge mounted in the print executing unit and an intermediate tank of the print executing unit.
Figure 2B:
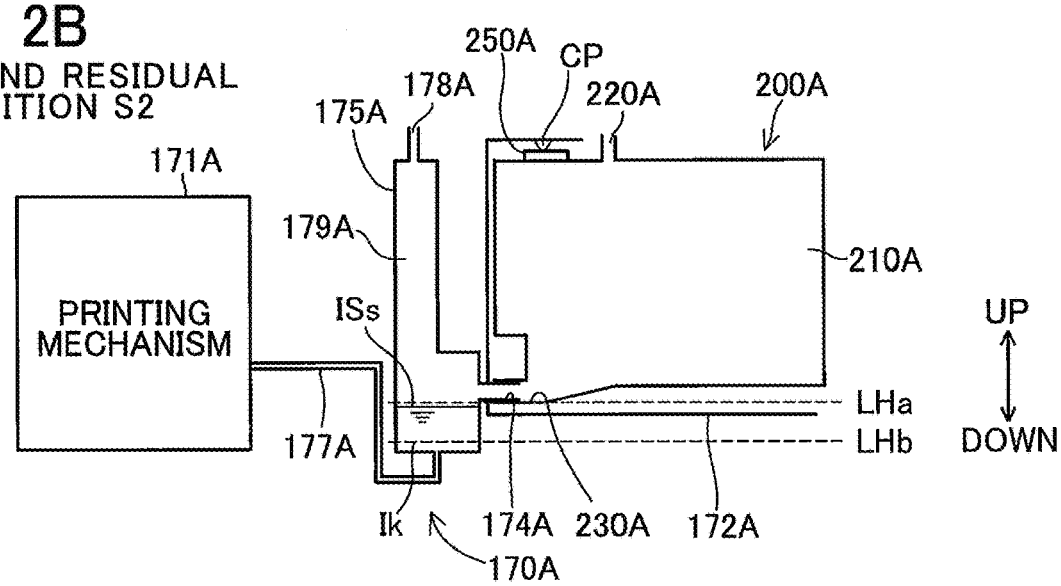
FIG. 2B is a schematic diagram illustrating the structure of the print executing unit of the printer having the double-chamber supply system and constituting the system according to the first embodiment, and particularly illustrating a second residual condition of ink in the ink cartridge mounted in the print executing unit and the intermediate tank of the print executing unit.
Figure 2C:
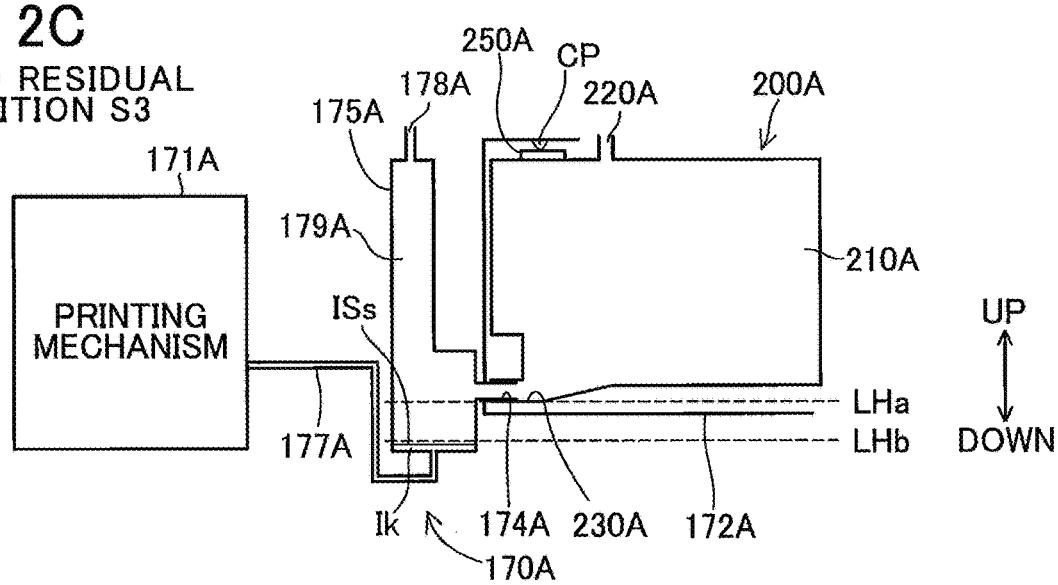
FIG. 2C is a schematic diagram illustrating the structure of the print executing unit of the printer having the double-chamber supply system and constituting the system according to the first embodiment, and particularly illustrating a third residual condition of ink in the ink cartridge mounted in the print executing unit and the intermediate tank of the print executing unit.

The print executing unit 170A executes printing operations under the control of the CPU 110. FIGS. 2A through 2C are schematic diagrams illustrating the structures of the print executing unit 170A. As illustrated in FIGS. 2A through 2C, the print executing unit 170A is provided with a printing mechanism 171A, a mounting portion 172A, an ink supply opening 174A, an intermediate tank 175A, and an ink channel section 177A.

The printing mechanism 171A is an inkjet-type printing mechanism that prints images on paper constituting a printing medium using ink supplied from an ink cartridge 200A as the printing agent. Specifically, the printing mechanism 171A forms images on paper by ejecting ink onto the paper from nozzles formed in a print head (not illustrated) to form dots on the paper. The printing mechanism 171A in the present embodiment prints color images using a plurality of colors of ink Ik, such as the four ink colors cyan (C), magenta (M), yellow (Y), and black (K). To avoid making the drawings too complicated, FIGS. 2A through 2C illustrates the mounting portion 172A, ink supply opening 174A, intermediate tank 175A, and ink channel section 177A for only a single color of ink Ik. However, the print executing unit 170A actually includes four each of the mounting portions 172A, ink supply openings 174A, intermediate tanks 175A, and ink channel sections 177A for the corresponding four colors of ink Ik. Further, four ink cartridges 200A respectively accommodating the four colors of ink Ik are mounted in the corresponding mounting portions 172A of the print executing unit 170A.

Formed in the ink cartridge 200A are a main storage chamber 210A for accommodating ink Ik, an air hole 220A, and an ink outlet 230A. The air hole 220A is an opening providing communication between the main storage chamber 210A and the external air. The ink outlet 230A is an opening through which the ink Ik is supplied from the main storage chamber 210A to the print executing unit 170A. The ink outlet 230A is provided near the bottom of the main storage chamber 210A so as to be capable of supplying all of the ink Ik in the main storage chamber 210A into the print executing unit 170A.

An integrated circuit chip (hereinafter called an "IC chip") 250A is mounted on the outer surface of the ink cartridge 200A. The IC chip 250A has a memory for storing various information about the ink cartridge 200A. The information stored in the memory of the IC chip 250A in the present embodiment includes information specifying an initial ink volume IV constituting the quantity of ink Ik accommodated in a new ink cartridge 200A, and identification information (a serial number, for example) identifying the ink cartridge 200A.

The mounting portion 172A is a holder, for example, in which the ink cartridge 200A is detachably mountable. The ink supply opening 174A is in connection with the ink outlet 230A of the ink cartridge 200A mounted in the mounting portion 172A, and the intermediate tank 175A communicates with the main storage chamber 210A via the ink supply opening 174A and ink outlet 230A. The ink Ik in the main storage chamber 210A is supplied into the print executing unit 170A through the ink supply opening 174A. The mounting portion 172A has a contact CP that contacts an electrode on the IC chip 250A of the ink cartridge 200A when the ink cartridge 200A is mounted in the mounting portion 172A. The printer 100A (the CPU 110) can read information stored in the memory of the IC chip 250A or write information to the memory of the IC chip 250A through the contact CP.

An auxiliary storage chamber 179A for accommodating the ink Ik and an air hole 178A are formed in the intermediate tank 175A. The air hole 178A is an opening providing communication between the auxiliary storage chamber 179A and the external air. The auxiliary storage chamber 179A communicates with the main storage chamber 210A of the ink cartridge 200A mounted in the mounting portion 172A via the ink supply opening 174A, and stores ink Ik supplied from the ink cartridge 200A through the ink supply opening 174A.

Hereinafter, "upstream" and "downstream" are used with respect to an ink supply direction from the ink cartridge 200A to the print executing unit 170A. The upstream end of the ink channel section 177A is connected to the bottom surface of the auxiliary storage chamber 179A of the intermediate tank 174A, and the ink channel section 177A is in communication with the auxiliary storage chamber 179A. The downstream end of the ink channel section 177A is connected to the print head (not illustrated) of the printing mechanism 171A. With this configuration, ink Ik in the auxiliary storage chamber 179A is supplied to the printing mechanism 171A through the ink channel section 177A.

As is clear from the above description, the intermediate tank 175A is disposed along the path of ink Ik flowing from the ink cartridge 200A mounted in the mounting portion 172A to the printing mechanism 171A.

This type of ink supply method that provides an intermediate tank along the path of the ink Ik leading from the ink cartridge to the printing mechanism, as in the print executing unit 170A of the printer 100A, will be called a double-chamber supply method. The print executing unit 170A (printing device) configured with a double-chamber supply system may be in one of three residual condition S1 through S3 representing the residual state of ink Ik. FIGS. 2A through 2C illustrate the print executing unit 170A in the three respective residual conditions S1 through S3.

In the first residual condition S1 illustrated in FIG. 2A, ink Ik remains in the ink cartridge 200A (in the main storage chamber 210A) and in the intermediate tank 175A (in the auxiliary storage chamber 179A). In the second residual condition S2 illustrated in FIG. 2B, ink Ik remains in the intermediate tank 175A (in the auxiliary storage chamber 179A), but no longer remains in the ink cartridge 200A (in the main storage chamber 210A), and the quantity of ink Ik in the intermediate tank 175A is at least a first reference volume V1. In the third residual condition S3 illustrated in FIG. 2C, ink Ik remains in the intermediate tank 175A (in the auxiliary storage chamber 179A), but not in the ink cartridge 200A (in the main storage chamber 210A), and the quantity of ink Ik in the intermediate tank 175A is less than the first reference volume V1. Here, the reference level LHa illustrated in FIGS. 2A through 2C denotes a level corresponding to the boundary between the first residual condition S1 and second residual condition S2, and a reference level LHb denotes a level corresponding to the boundary between the second residual condition S2 and third residual condition S3.

The main storage chamber 210A in the ink cartridge 200A communicates with the atmosphere through the air hole 220A, while the auxiliary storage chamber 179A in the intermediate tank 175A communicates with the atmosphere through the air hole 178A. The auxiliary storage chamber 179A of the intermediate tank 175A includes a section positioned lower (below in FIGS. 2A to 2C) than the bottom of the main storage chamber 210A (the lower end of the main storage chamber 210A in the vertical direction) formed in the ink cartridge 200A, and a section positioned higher than the bottom of the main storage chamber 210A in the vertical direction. Thus, when a new ink cartridge 200A is mounted in the mounting portion 172A, some of the ink Ik in the ink cartridge 200A transfers from the main storage chamber 210A into the auxiliary storage chamber 179A through the ink supply opening 174A. Consequently, the level ISm of ink Ik in the main storage chamber 210A and the level ISs of ink Ik in the auxiliary storage chamber 179A are adjusted to the same height (see FIG. 2A).

As ink Ik is consumed through printing by the printing mechanism 171A, the levels Ism and ISs drop while remaining at the same level as each other. Once the levels ISm and ISs reach the reference level LHa corresponding to the bottom of the main storage chamber 210A, ink Ik no longer remains in the main storage chamber 210A. Hence, the residual state of ink Ik shifts from the first residual condition S1 illustrated in FIG. 2A to the second residual condition S2 illustrated in FIG. 2B. Here, the state in which ink Ik no longer remains in the main storage chamber 210A of the ink cartridge 200A signifies that ink Ik no longer transfers from the main storage chamber 210A into the auxiliary storage chamber 179A and includes a state in which some ink Ik remains deposited on the inner walls of the main storage chamber 210A.

The printing mechanism 171A can continue to print even after the residual state of ink Ik has shifted to the second residual condition S2, provided that ink Ik remains in the auxiliary storage chamber 179A. If the ink cartridge 200A is replaced with a new ink cartridge after the residual state has shifted to the second residual condition S2, ink Ik will not be wasted since no ink Ik remains in the old ink cartridge 200A being replaced. Hence, the double-chamber supply method is advantageous in that the ink cartridge 200A can be replaced while printing is still possible, without wasting any ink Ik.

The ink volume corresponding to the boundary between the first residual condition S1 and the second residual condition S2 will be called a boundary ink volume BV. The boundary ink volume BV in the present embodiment may be considered the volume of ink Ik in the auxiliary storage chamber 179A when the level ISs in the auxiliary storage chamber 179A reaches the reference level LHa. The boundary ink volume BV may also be considered the maximum ink volume in the second residual condition S2. Further, the boundary ink volume BV is equivalent to the capacity of the section of the auxiliary storage chamber 179A positioned below the bottom of the main storage chamber 210A.

As ink Ik continues to be consumed through printing by the printing mechanism 171A after the state of the ink Ik has shifted to the second residual condition S2, the level ISs continues to drop. When the level ISs drops to lower than the reference level LHb, the quantity of ink Ik in the intermediate tank 175A is reduced to less than the above-described first reference volume V1, and the residual state of the ink Ik shifts from the second residual condition S2 to the third residual condition S3.

If printing were continued after the residual state of ink Ik has shifted to the third residual condition S3, the quantity of ink Ik in the intermediate tank 175A would continue to decrease and could lead to the problem of air becoming mixed in the ink Ik supplied to the printing mechanism 171A. Consequently, printing with the printing mechanism 171A must be halted once the residual state of ink Ik has shifted to the third residual condition S3. Hence, the third residual condition S3 is the residual state in which the intermediate tank 175A is essentially out of ink Ik, and, therefore, the residual state in which the printing mechanism 171A cannot print until the ink cartridge 200A has been replaced and ink Ik has been supplied into the intermediate tank 175A.

The information database IB stores printer information related to the printer 100A. The printer information includes information specifying the serial number and model name of the printer 100A, for example. The printer information further includes ink information regarding the ink Ik, and history information about the printing history, for example. The ink information for the printer 100A may include the initial ink volume IV for the ink cartridge 200A, the boundary ink volume BV, a residual ink volume RV, a number of remaining printing days RD, and status information specifying the residual state of ink Ik. In the present embodiment, the boundary ink volume BV is information common to all four colors of ink Ik, while the initial ink volume IV, residual ink volume RV, and status information for the ink Ik is information provided individually for each color of ink Ik. The history information for the printer 100A is information related to the printing history, such as the number of printed pages printed within a specific period, and the total number of printed pages.

The remaining printing days RD is a number specifying a period of days commensurate with the residual ink volume RV, and specifically specifies the period of days in which printing will be possible without replacing the ink cartridge 200A. For example, a number of remaining printing days RD of ten days signifies that the printer 100A can continue printing for ten days from the current date without having the ink cartridge 200A replaced. The residual ink volume RV and the remaining printing days RD may be considered index values related to the residual quantity of ink Ik.

The printer 100A (the CPU 110) maintains the printer information in the information database IB at the latest information by updating the history information and ink information stored in the information database IB each time a printing operation is executed, for example. The initial ink volume IV may be acquired from the memory on the IC chip 250A of the ink cartridge 200A, for example. Each time the ink cartridge 200A is replaced, the printer 100A records the sum of the residual quantity of ink Ik in the intermediate tank 175A at that point in time and the initial ink volume IV in the information database IB as the residual ink volume RV, for example. Each time a printing operation is executed, the printer 100A calculates the residual ink volume RV after execution of the printing operation by calculating the consumed quantity of ink Ik and subtracting this quantity from the residual ink volume RV prior to execution of the printing operation. Each time a printing operation is executed, the printer 100A also updates the residual ink volume RV recorded in the information database IB to the residual ink volume RV after execution of the printing operation. Each time the residual ink volume RV is updated, the printer 100A calculates the remaining printing days RD by dividing the updated residual ink volume RV by the average quantity of ink Ik consumed per day and records the remaining printing days RD in the information database IB. The printer 100A calculates the average quantity of ink Ik consumed per day on the basis of the history information for the printer 100A.

Each time the ink cartridge 200A is replaced, the printer 100A also updates the status information recorded in the information database IB to "NORMAL," denoting the first residual condition S1, for example. When the residual ink volume RV recorded in the information database IB becomes less than the boundary ink volume BV, the printer 100A updates the status information recorded in the information database IB to "LOW," denoting the second residual condition S2. When the residual ink volume RV recorded in the information database IB becomes less than the first reference volume V1, the printer 100A updates the status information recorded in the information database IB to "OUT," denoting the third residual condition S3.

The printer 100B is provided with a print executing unit 170B (see FIG. 1) configured with the double-chamber supply system similar to the print executing unit 170A of the printer 100A. The remaining structure of the printer 100B is also identical to that of the printer 100A. However, the capacity of the intermediate tank (auxiliary storage chamber) in the print executing unit 170B may differ from the capacity of the intermediate tank 175A (auxiliary storage chamber 179A) in the print executing unit 170A. Further, an ink cartridge 200B (see FIG. 1) mounted in the print executing unit 170B has a different initial ink volume IV from the initial ink volume IV in the ink cartridge 100A mounted in the print executing unit 170A.

The printer 100C is provided with a print executing unit 170C that differs from the print executing unit 170A of the printer 100A. The remaining structure of the printer 100C is identical to that of the printer 100A. The print executing unit 170C employs a single-chamber supply method that does not provide an intermediate tank along the path of the ink Ik flowing from an ink cartridge 200C to a printing mechanism 171C of the print executing unit 170C.

FIGS. 3A through 3C are schematic diagrams illustrating the structures of the print executing unit 170C of the printer 100C. The print executing unit 170C is provided with an inkjet-type printing mechanism 171C similar to the printing mechanism 171A of the printer 100A, a mounting portion 172C, an ink supply opening 174C, and an ink channel section 177C.

As with the ink cartridge 200A, the ink cartridge 200C has a storage chamber 210C that accommodates ink Ik, an air hole 220C that provides communication between the storage chamber 210C and the external air, and an ink outlet 230C through which ink Ik is supplied to the print executing unit 170C. As with the ink cartridge 200A, an IC chip 250C is mounted on the outer surface of the ink cartridge 200C.

The mounting portion 172C is a holder, for example, in which the ink cartridge 200C is detachably mountable. The ink supply opening 174C is in connection with the ink outlet 230C of the ink cartridge 200C mounted in the mounting portion 172C. The upstream end of the ink channel section 177C is in connection with the ink supply opening 174C, while the downstream end of the ink channel section 177C is in connection with the print head (not illustrated) in the print executing unit 170C. With this configuration, the printing mechanism 171C of the print executing unit 170C communicates with the storage chamber 210C of the ink cartridge 200C mounted in the mounting portion 172C, and ink Ik in the ink cartridge 200C (the storage chamber 210C) is supplied to the printing mechanism 171C through the ink channel section 177C.

The print executing unit 170C (as an example of the printing device) configured with a single-chamber supply system takes on one of three residual conditions S4 through S6 indicating the residual state of ink Ik. FIGS. 3A through 3C illustrate the print executing unit 170C in each of the three residual conditions S4 through S6.

The fourth residual condition S4 in FIG. 3A illustrates the state of the print executing unit 170C when the quantity of ink Ik remaining in the ink cartridge 200C (the storage chamber 210C) is greater than or equal to a second reference volume V2. The fifth residual condition S5 in FIG. 3B illustrates the state of the print execution unit 170C when the quantity of ink Ik remaining in the ink cartridge 200C is less than the second reference volume V2 but greater than or equal to a third reference volume V3 that is smaller than the second reference volume V2. The sixth residual condition S6 illustrates the state of the print execution unit 170C when the quantity of ink Ik remaining in the ink cartridge 200C is less than the third reference volume V3. In FIGS. 3A through 3C, a reference level LHc denotes the level of ink Ik corresponding to the boundary between the fourth residual condition S4 and fifth residual condition S5, and a reference level LHd denotes the level of ink Ik corresponding to the boundary between the fifth residual condition S5 and sixth residual condition S6.

As ink Ik is consumed through printing by the printing mechanism 171C, the level IS of ink Ik drops. When the level IS of ink Ik in the ink cartridge 200C drops to lower than the reference level LHc, the residual state of ink Ik shifts from the fourth residual condition S4 illustrated in FIG. 3A to the fifth residual condition S5 illustrated in FIG. 3B. The quantity of ink Ik in the ink cartridge 200C when the level IS is at the reference level LHc corresponds to the second reference volume V2 described above.

From this point, the level IS of ink Ik continues to drop as ink Ik is consumed through printing by the printing mechanism 171C. When the level IS of ink Ik in the ink cartridge 200C becomes lower than the reference level LHd, the residual state of ink Ik shifts from the fifth residual condition S5 illustrated in FIG. 3B to the sixth residual condition S6 illustrated in FIG. 3C. The quantity of ink Ik in the ink cartridge 200C when the level IS is at the reference level LHd corresponds to the third reference volume V3 described above.

If printing is continued after the residual state of ink Ik has shifted to the sixth residual condition S6, the quantity of ink Ik in the ink cartridge 200C will continue to decline, leading to the potential for air becoming mixed in the ink Ik supplied to the printing mechanism 171C. Therefore, printing with the printing mechanism 171C must be halted when the residual state of ink Ik shifts to the sixth residual condition S6. Hence, the sixth residual condition S6 is the state in which the ink cartridge 200C is essentially out of ink Ik and the printing mechanism 171C cannot print until the ink cartridge 200C is replaced. Unlike a double-chamber supply system such as the printer 100A, the printer 100C employs a single-chamber supply system and, thus, is not provided with the intermediate tank 175A. Accordingly, printing cannot continue after the ink cartridge 200C runs out of ink Ik.

An information database IB in the printer 100C stores printer information related to the printer 100C. This printer information includes information specifying the serial number and model name of the printer 100C, for example. As with the printer information for the printer 100A, printer information for the printer 100C also includes ink information regarding the ink Ik, and history information about the printing history of the printer 100C, for example. The ink information for the printer 100C may include the initial ink volume IV for the ink cartridge 200C, the residual ink volume RV, the number of remaining printing days RD, and status information indicating the residual state of ink Ik for each color of ink Ik, for example. Since the printer 100C employs a single-chamber supply system, the ink information for the printer 100C does not include the boundary ink volume BV. As with the history information for the printer 100A, history information for the printer 100C is information related to the printing history, such as the number of printed pages printed within a specific period, and the total number of printed pages.

The printer 100C (the CPU 110) maintains the printing information in the information database IB at the latest information by updating the history information and ink information stored in the information database IB each time a printing operation is executed, for example. The initial ink volume IV may be acquired from the memory on the IC chip 250C of the ink cartridge 200C, for example. Each time the ink cartridge is replaced, the printer 100C records the initial ink volume IV in the information database IB as the residual ink volume RV, for example. Each time a printing operation is executed, the printer 100C calculates the residual ink volume RV after execution of the printing operation by calculating the consumed quantity of ink Ik and subtracting this quantity from the residual ink volume RV prior to execution of the printing operation. Each time a printing operation is executed, the printer 100C also updates the residual ink volume RV recorded in the information database IB to the residual ink volume RV after execution of the printing operation. Each time the residual ink volume RV is updated, the printer 100C calculates the remaining printing days RD by dividing the updated residual ink volume RV by the average quantity of ink Ik consumed per day and records the remaining printing days RD in the information database IB.

Each time the ink cartridge is replaced, the printer 100C also updates the status information recorded in the information database IB to "NORMAL," denoting the fourth residual condition S4, for example. When the residual ink volume RV recorded in the information database IB becomes less than the second reference volume V2, the printer 100C updates the status information recorded in the information database IB to "LOW," denoting the fifth residual condition S5. When the residual ink volume RV recorded in the information database IB becomes less than the third reference volume V1, the printer 100C updates the status information recorded in the information database IB to "OUT," denoting the sixth residual condition S6.

The printers 100A, 100B, and 100C provided in the system 1000 have been described. Although the system 1000 is provided with other printers, a description of the other printers has been omitted, but the other printers each employ one of a single-chamber supply system and double-chamber supply system.

An adequate amount of time (two to three days, for example) is needed for the user to obtain an ink cartridge (hereinafter called a "replacement cartridge") to replace the ink cartridge currently in use. For example, a sufficient amount of time should be allowed for the replacement cartridge to reach the user after the replacement cartridge has been ordered from the manufacturer. Alternatively, a sufficient length of time should be allowed for the person in charge of printer supplies to purchase a replacement cartridge from the store.

For a printer employing a single-chamber supply system (the printer 100C, for example), the quantity of ink Ik is relatively low when the residual state of ink Ik reaches the fifth residual condition S5 (see FIG. 3B). Thus, in order to ensure continuous printing and avoid a period in which the printer runs out of ink Ik and is incapable of printing, a replacement cartridge for a printer employing a single-chamber supply system should be prepared by placing an order for the replacement cartridge or the like when the residual state of ink Ik reaches the fifth residual condition S5.

However, if the ink cartridge for a printer employing a single-chamber supply system is replaced while the residual state of ink Ik is in the fifth residual condition S5, some ink Ik will be wasted because ink Ik still remains in the ink cartridge 200C when the residual state of the ink Ik is in the fifth residual condition S5. Thus, from the perspective of avoiding ink wastage, there is no reason to replace the ink cartridge in a printer having a single-chamber supply system while the residual state of ink Ik is in the fifth residual condition S5. However, when the residual state is the sixth residual condition S6 for a printer employing a single-chamber supply system (see FIG. 3C), the ink cartridge can be replaced without wasting any ink Ik since the ink cartridge 200C essentially does not contain ink Ik in this state.

As described above, the fifth residual condition S5 can be considered the state of a printer employing a single-chamber supply system for which a replacement cartridge must be ordered, and the sixth residual condition S6 can be considered the state in which the ink cartridge must be replaced.

For a printer employing a double-chamber supply system (the printer 100A, for example), the residual quantity of ink Ik is relatively low when the residual state of ink Ik reaches the second residual condition S2 (see FIG. 2B). Thus, a replacement cartridge should be ordered for a printer having a double-chamber supply system when the residual state of ink Ik is the second residual condition S2 in order to ensure continuous printing while avoiding a period in which the printer having the double-chamber supply system runs out of ink Ik and is incapable of printing.

If the ink cartridge in a printer employing a double-chamber supply system is replaced while the residual state of ink is the second residual condition S2, ink Ik will not be wasted since no ink Ik remains in the ink cartridge 200A in the second residual condition S2. Therefore, the ink cartridge for a printer employing a double-chamber supply system can be replaced without wasting any ink Ik, whether the residual state of ink Ik is the second residual condition S2 or the third residual condition S3.

As described above, the second residual condition S2 may be considered a state in which a replacement cartridge should be ordered for a printer having a double-chamber supply system, and both the second residual condition S2 and third residual condition S3 may be considered a state in which the ink cartridge of a printer having a double-chamber supply system should be replaced.

The management server 300 is a computer owned by the administrator of the printers 100A, 100B, and 100C. The management server 300 is provided with a CPU 310 serving as the processor of the management server 300; a volatile storage 320, such as a DRAM; a nonvolatile storage 330, such as a hard disk drive or a flash memory; a display 340, such as a liquid crystal display that displays images; an operation interface 350, such as a keyboard, mouse, and the like; and a communication interface 380.

The communication interface 380 is connected to the local area network NT. As with the communication interface 180 of the printer 100A, the communication interface 380 is a wired interface conforming with Ethernet (registered trademark) or a wireless interface conforming with Wi-Fi technology or a standard based on the Wi-Fi technology.

The CPU 310 is a processor that performs data processes. The volatile storage 320 provides a buffer region for temporarily storing various intermediate data generated when the CPU 310 performs processes. The nonvolatile storage 330 stores a computer program PG2, and a management database PD.

The computer program PG2 is an application program provided in a downloadable format from a vendor server. Here, the vender server is a server provided by the company that manages the system 1000 or the vendor that manufactures the printers 100A, 100B, and 100C. Alternatively, the computer program PG2 may be provided in a recorded format, such as on a CD-ROM, or may be pre-stored in the nonvolatile storage 330 when the management server 300 is manufactured.

By executing the computer program PG2, the management server 300 (the CPU 310) can execute processes described later related to management of the printers 100A, 100B, and 100C in the system 1000, such as a database updating process and a printer information display process.

The management database PD records printer information collected by the management server 300. FIG. 4 illustrates an example of the management database PD according to the present embodiment. As illustrated in FIG. 4, the management database PD includes a plurality of entries respectively corresponding to a plurality of printers in the system 1000. FIG. 4 illustrates only entries EN1, EN2, and EN3 corresponding to the printers 100A, 100B, and 100C under management as a representative.

The entry EN1 corresponds to the printer 100A, and includes a plurality of printer information items for the printer 100A, and specifically a serial number, a model name, an IP address, a supply system, and a boundary ink volume BV. The entry EN1 further includes a residual ink volume RV, a number of remaining printing days RD (abbreviated as "REMAINING DAYS RD" in FIG. 4), and a residual state of ink Ik for each of the four colors (CMYK) of ink Ik.

The serial number is identification information used to identify the printer 100A. The model name specifies the model of the printer 100A. The IP address is an address that has been assigned to the printer 100A.

The residual state of ink Ik may take on one of the values "NORMAL," "LOW," and "OUT." The supply system indicates one of the single-chamber supply system and double-chamber supply system described above, and is the double-chamber supply system for the printer 100A.

As described above, the residual ink volume RV is the quantity of ink Ik remaining in the ink cartridge 200A and intermediate tank 175A for the printer 100A employing a double-chamber supply system, for example. On the other hand, the residual ink volume RV is the quantity of ink Ik remaining in the ink cartridge 200C for the printer 100C employing a single-chamber supply system, for example. As described above, the number of remaining printing days RD specifies the period of days in which printing will be possible without replacing the ink cartridge 200A.

The entries EN2 and EN3 for the printer 100B and printer 100C, respectively, include information for the same items that are included in the entry EN1 for the printer 100A. However, the printer 100C employs a single-chamber supply system and is not provided with an intermediate tank. Accordingly, the entry EN3 does not include a boundary ink volume BV.

Of the printer information recorded in the management database PD in the present embodiment, the serial number, model name, IP address, supply system, and boundary ink volume BV for each printer are acquired by the management server 300 when operations of the system 1000 are initiated, for example. In the present embodiment, Simple Network Management Protocol (SNMP) is used for acquiring this information. Specifically, the management server 300 broadcasts an SNMP request over the local area network NT to search for printers on the local area network NT. The plurality of printers under management issue responses to the SNMP request that include their own IP addresses. The management server 300 then uses each IP address received in response to the SNMP request to transmit an individual SNMP request to each of the printers under management requesting the transmission of their serial number, model name, supply system, and boundary ink volume BV, and receives the serial number, model name, supply system, and boundary ink volume BV for each of the printers under management in response to these SNMP requests. The management server 300 then records the corresponding serial number, model name, supply system, and boundary ink volume BV in the management database PD, thereby registering the plurality of printers as printers under management.

Of the printer information recorded in the management database PD, the residual ink volume RV, the remaining printing days RD, and the residual state are acquired from a plurality of printers under management in a database updating process described below.

A-2. Operations of the System 1000

A-2-1. Database Updating Process

The management server 300 (the CPU 310) executes a database updating process as one of management processes for managing a plurality of printers under management. The management server 300 continuously executes the database updating process while the computer program PG2 is running.

Figure 5:
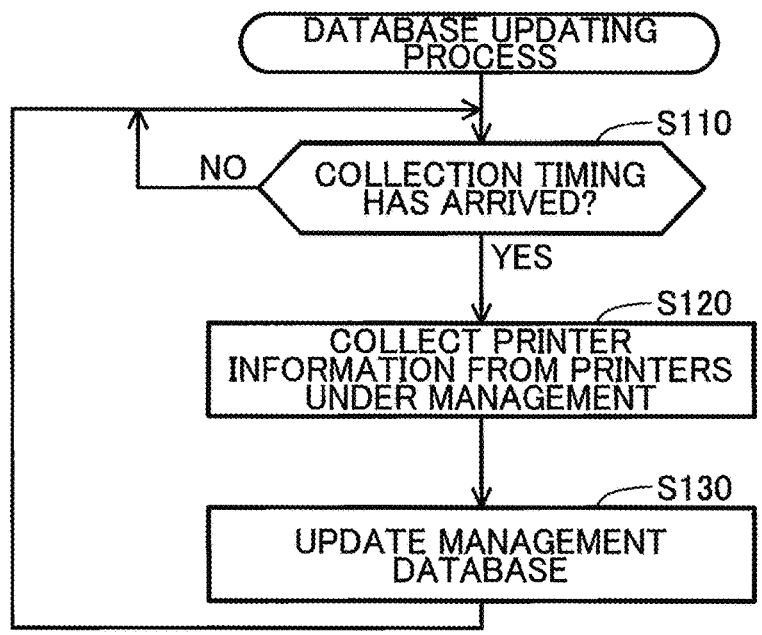
FIG. 5 is a flowchart illustrating steps in a database updating process executed by the management server according to the first embodiment.

FIG. 5 is a flowchart illustrating steps in the database updating process. In S110 of FIG. 5, the management server 300 determines whether a collection timing for collecting printer information has arrived. The collection timing is a predetermined timing set to periodic intervals. In the present embodiment, the collection timing arrives at a frequency of once per hour. However, the collection timing may be set to a different frequency, such as once per day. When the management server 300 determines that the collection timing has arrived (S110: YES), the management server 300 advances to S120. While the collection timing has not arrived (S110: NO), the management server 300 waits until the collection timing has arrived.

In S120 the management server 300 collects printer information from each of the printers under management. In the present embodiment, the management server 300 collects printer information using SNMP. Specifically, the management server 300 transmits a SNMP request to each of the printers under management requesting desired items to be collected from the printer information. The management server 300 subsequently receives this printer information from each of the printers under management as a response to the SNMP request. In the present embodiment, the management server 300 collects information specifying the residual ink volume RV, remaining printing days RD, and residual state of ink Ik described above for each of the four colors (CMYK) of ink Ik.

In S130 the management server 300 updates the management database PD by recording the collected printer information in the management database PD stored in the volatile storage device 120. After updating the management database PD, the management server 300 returns to S110.

A-2-2. Printer Information Display Process

The management server 300 (the CPU 310) also executes a printer information display process as one of the management processes for managing the printers under management. The printer information display process is performed when a display request is received from the user via the operating interface 350 to display a management list ML on the display 340. The user of the management server 300 is the administrator of the system 1000, for example. The administrator of the system 1000 may be a user of the printers under management or may be someone other than a user of the printers under management, such as the vendor of the printers under management.

Figure 6:
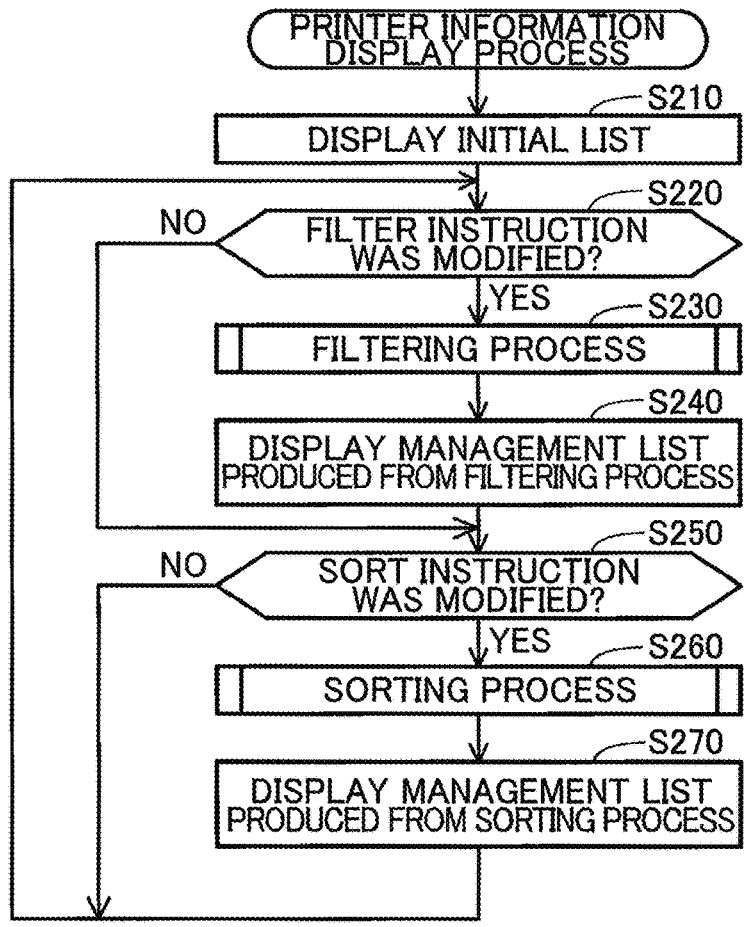
FIG. 6 is a flowchart illustrating steps in a printer information display process executed by the management server according to the first embodiment.

FIG. 6 is a flowchart illustrating steps in the printer information display process. In S210 of FIG. 6, the management server 300 displays an initial list ML0 on the display 340. The initial list ML0 is a default management list ML.

FIGS. 7A through 7D are first drawings illustrating examples of management lists ML according to the first embodiment. The initial list ML0 illustrated in FIG. 7A is a list of printer information for the printers under management (seven printers in the example of FIGS. 7A through 7D). The initial list ML0 is generated on the basis of the management database PD. The initial list ML0 includes seven lines corresponding to the seven printers under management. Each of the seven lines includes a model name and a supply system. Each of the seven lines also includes the residual state of ink Ik and the remaining printing days RD (abbreviated as "REMAINING DAYS" in FIGS. 7A through 7D) for each of the four CMYK colors of ink. The seven rows are arranged in a predetermined initial order, such as the order in which the printers were registered in the management database PD.

As illustrated in FIGS. 7A through 7D, each of the management lists ML displayed on the display 340 includes a first pull-down menu PMa and a second pull-down menu PMb. The first pull-down menu PMa is an input element (a user interface widget) with which the user can input a filter instruction. The second pull-down menu PMb is an input element with which the user can input a sort instruction.

The three filter instructions that can be inputted with the first pull-down menu PMa are "ALL," "ORDER," and "REPLACE." "ALL" is a filter instruction indicating that the lines for all printers are to be displayed. "ORDER" is a filter instruction for displaying only those lines of printers for which ink cartridges of one or more colors must be ordered. "REPLACE" is a filter instruction for displaying only those lines of printers for which ink cartridges of one or more colors must be replaced. In this way, the management server 300 can acquire one of the filter instructions selected by the user via the first pull-down menu PMa.

The sort instructions that can be inputted using the second pull-down menu PMb are "-", "INK QTY (TOTAL)," "C INK QTY," "M INK QTY," "Y INK QTY," and "K INK QTY." Here, "-" is a sort instruction for arranging the displayed lines in the initial order. "INK QTY (TOTAL)" is a sort instruction for arranging the displayed printers on the basis of the total quantity of ink Ik for the four CMYK colors. "C INK QTY" is a sort instruction for arranging the displayed printers on the basis of the quantity of C ink. Similarly, "M INK QTY," "Y INK QTY," and "K INK QTY" are sort instructions for arranging the displayed printers on the basis of the respective quantities of M, Y, and K ink. In this way, the management server 300 can acquire one of the sort instructions selected by the user via the second pull-down menu PMb.

The initial list ML0 illustrated in FIG. 7A may be considered the management list ML to be displayed when the filter instruction is "ALL" and the sort instruction is "-".

In S220 of FIG. 6, the management server 300 determines whether the filter instruction selected with the first pull-down menu PMa was modified on the basis of a user operation. If the filter instruction was modified (S220: YES), in S230 the management server 300 executes a filtering process. In S240 the management server 300 displays the management list ML resulting from the filtering process on the display 340 in place of the currently displayed management list ML. The filtering process and the management list ML produced from the filtering process will be described later. If the filter instruction was not modified (S220: NO), the management server 300 skips steps S230 and S240.

In S250 the management server 300 determines whether the sort instruction selected with the second pull-down menu PMb was modified on the basis of a user operation. If the sort instruction was modified (S250: YES), in S260 the management server 300 executes a sorting process. In S270 the management server 300 displays the management list ML resulting from the sorting process on the display 340 in place of the currently displayed management list ML, and subsequently returns to S220. The sorting process and the management list ML produced from the sorting process will be described later. If the sort instruction was not modified (S250: NO), the management server 300 skips steps S260 and S270 and returns to S220.

A-2-3. Filtering Process

Figure 8:
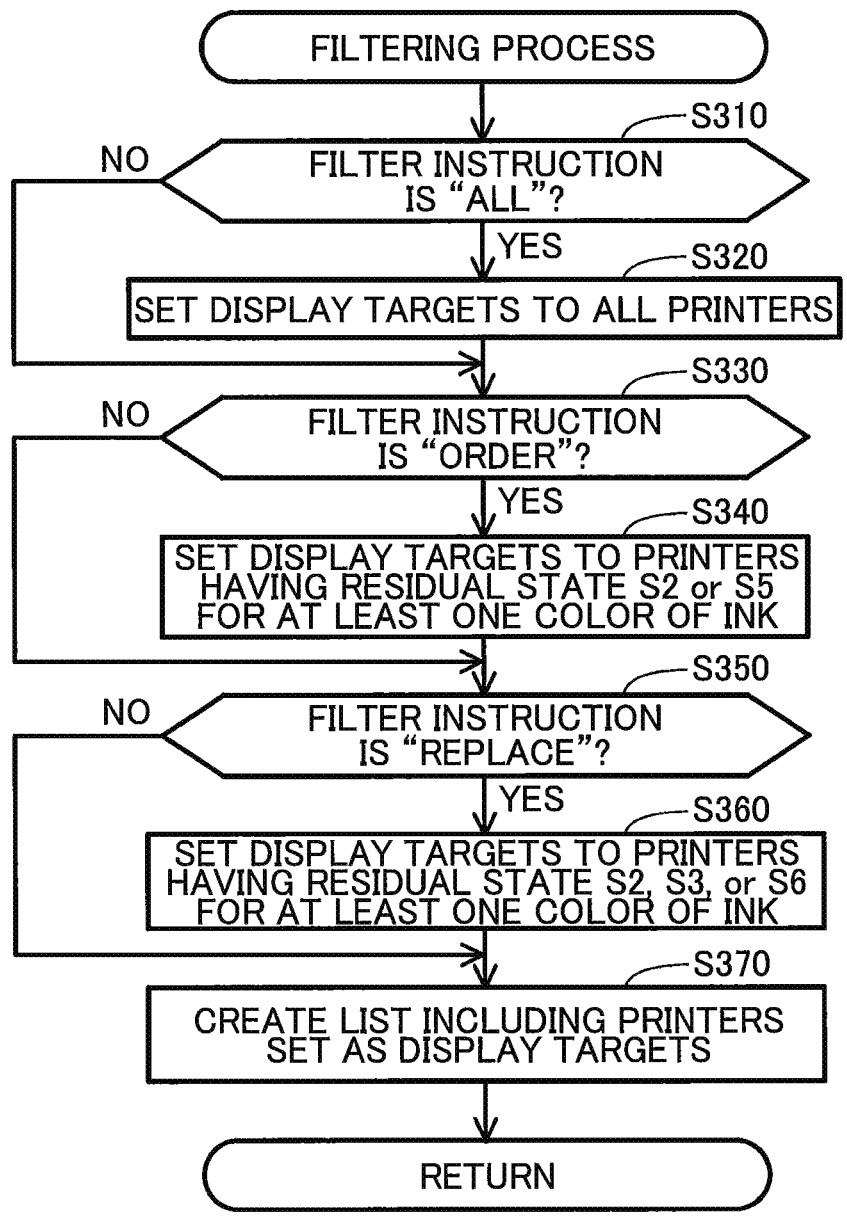
FIG. 8 is a flowchart illustrating steps in a filtering process executed by the management server according to the first embodiment.

Next, the filtering process of S230 in FIG. 6 will be described. FIG. 8 is a flowchart illustrating steps in the filtering process.

In S310 of FIG. 8, the management server 300 determines whether the modified filter instruction is "ALL." If the filter instruction is "ALL" (S310: YES), in S320 the management server 300 sets the display targets to all printers under management. However, if the filter instruction is not "ALL" (S310: NO), the management server 300 skips S320.

In S330 the management server 300 determines whether the modified filter instruction is "ORDER." If the filter instruction is "ORDER" (S330: YES), in S340 the management server 300 designates the display targets to be only those printers under management having a residual state set to the second residual condition S2 or fifth residual condition S5 for at least one color of ink Ik. The group comprising the printers designated in this step will be called the order group. However, when the filter instruction is not "ORDER" (S330: NO), the management server 300 skips S340.

In S350 the management server 300 determines whether the modified filter instruction is "REPLACE." If the filter instruction is "REPLACE" (S350: YES), in S360 the management server 300 designates the display targets to be only those printers under management having a residual state set to one of the second residual condition S2, third residual condition S3, and sixth residual condition S6 for at least one color of ink Ik. The group formed of printers designated in this step will be called the replace group. However, if the filter instruction is not "REPLACE" (S350: NO), the management server 300 skips S360.

In S370 the management server 300 creates a filtered list that includes the printers designated as display targets and subsequently ends the filtering process.

One example of a management list ML created when the filter instruction is "ALL" is the initial list ML0 illustrated in FIG. 7A. The initial list ML0 includes all printers under management. In the example of FIG. 7A, the printers under management are the seven printers having the model names Dev_1 through Dev_7.

One example of a management list ML created when the filter instruction is "ORDER" is an order group list ML1 illustrated in FIG. 7B. The order group list ML1 includes three of the seven printers under management having model names Dev_2, Dev_4, and Dev_6. The printer having model name Dev_2 has a residual state for C ink Ik set to the second residual condition S2. The printer having model name Dev_4 has a residual state for Y ink Ik set to the second residual condition S2. The printer having model name Dev_6 has a residual state for K ink Ik set to the fifth residual condition S5. Hence, it is clear that these three printers should all belong to the order group. Shaded items in the order group list ML1 illustrated in FIG. 7B are items that were used as filtering keys.

One example of a management list ML created when the filter instruction is "REPLACE" is a replace group list ML2 illustrated in FIG. 7C. This replace group list ML2 includes four of the seven printers under management having model names Dev_2 through Dev_5. The printers with model names Dev_2 and Dev_4 have residual states set to the second residual condition S2 for C and Y ink Ik, respectively, as described above. The printer having model name Dev_3 has a residual state for C ink Ik set to the sixth residual condition S6. The printer having model name Dev_5 has a residual state set to the third residual condition S3 for both M and K ink Ik. Hence, it is clear that these four printers all belong to the replace group. Shaded items in the replace group list ML2 illustrated in FIG. 7C are items that were used as filtering keys.

Printers having at least one color of ink Ik in the second residual condition S2, such as the printers with model names Dev_2 and Dev_4 in this example, are included in both the order group list ML1 and replace group list ML2.

A-2-4. Sorting Process

Figure 9:
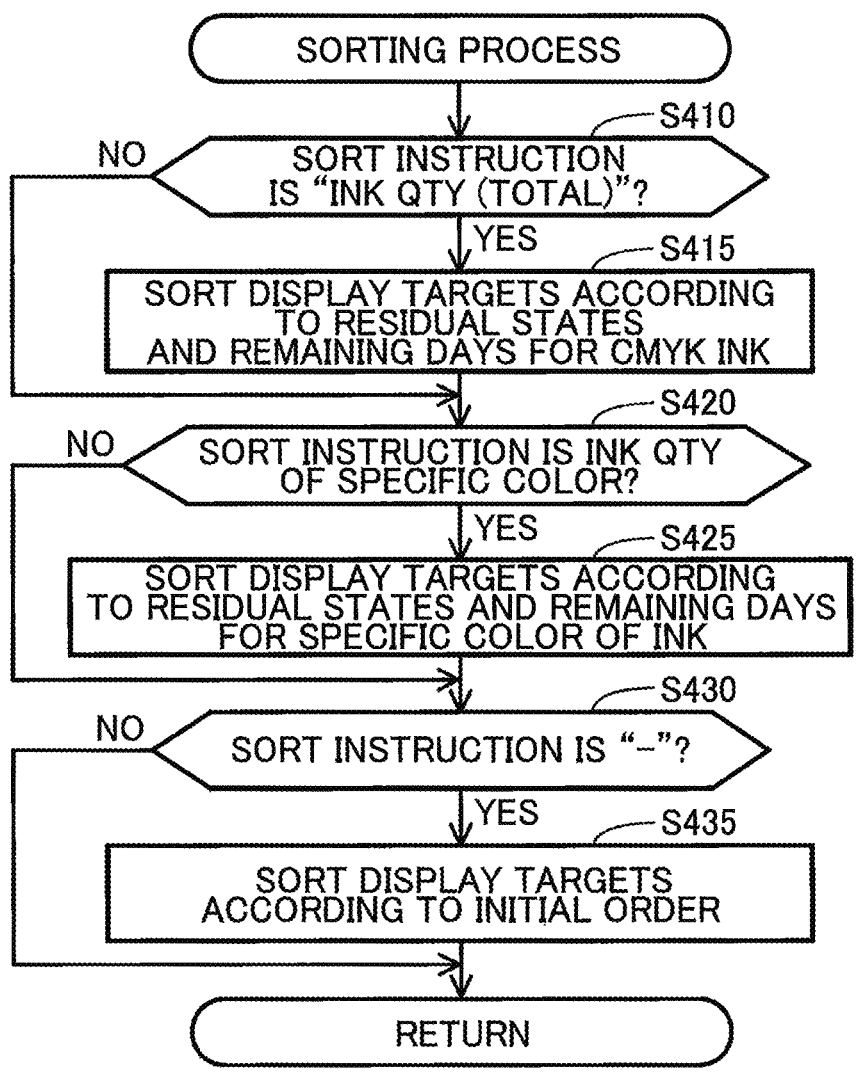
FIG. 9 is a flowchart illustrating steps in a sorting process executed by the management server according to the first embodiment.

Next, the sorting process of S260 in FIG. 6 will be described. FIG. 9 is a flowchart illustrating steps in the sorting process.

In S410 of FIG. 9 the management server 300 determines whether the modified sort instruction is "INK QTY (TOTAL)." If the sort instruction is "INK QTY (TOTAL)" (S410: YES), in S415 the management server 300 sorts the printers set as display targets on the basis of the residual state of ink Ik and the remaining printing days RD for the four CMYK colors. Specifically, the management server 300 sorts the printers set as the display targets such that printers satisfying the following conditions (1) to (4) are given higher priority in order of the condition numbers (1) to (4). The conditions (1) to (4) are as follows:

(1) Printers having a residual state set to the third residual condition S3 or the sixth residual condition S6 for at least one of the four CMYK colors of ink Ik, i.e., printers having a residual state of "OUT" for at least one color of ink Ik;

(2) Printers that do not satisfy condition (1) and have a residual state set to the second residual condition S2 for at least one of the four CMYK colors of ink Ik, i.e., printers having a residual state set to "LOW" for at least one color of ink Ik and whose supply system is a "double-chamber supply system";

(3) Printers that do not satisfy condition (1) and that have a residual state set to the fifth residual condition S5 for at least one of the four CMYK colors of ink Ik, i.e., printers having a residual state set to "LOW" for at least one color of ink Ik and whose supply system is a "single-chamber supply system"; and (4) Printers whose residual state is set to either the first residual condition S1 or the fourth residual condition S4 for all four CMYK colors of ink Ik, i.e., printers having a residual state set to "NORMAL" for all colors of ink Ik.

When a plurality of printers satisfies condition (1), the printers in this group are sorted while giving higher priority to those printers having a larger number of colors of ink Ik whose residual state is set to either the third residual condition S3 or the sixth residual condition S6.

When a plurality of printers satisfies condition (2), the printers satisfying condition (2) are sorted while giving higher priority to those printers having a larger number of colors of ink Ik whose residual state is set to the second residual condition S2. Printers having the same number of colors of ink Ik whose residual state is set to the second residual condition S2 are further sorted while giving priority to those printers having a smaller minimum value of remaining printing days RD for the one or more colors of ink Ik in the second residual condition S2.

When a plurality of printers satisfies condition (3), the printers satisfying condition (3) are sorted while giving higher priority to those printers having a larger number of colors of ink Ik whose residual state is set to the fifth residual condition S5. Printers having the same number of colors of ink Ik whose residual state is set to the fifth residual condition S5 are further sorted while giving priority to those printers having a smaller minimum value of remaining printing days RD for the one or more colors of ink Ik in the fifth residual condition S5.

When a plurality of printers satisfies condition (4), the printers satisfying condition (4) are sorted in order of printers having a smaller minimum value of remaining printing days RD for the four colors of ink Ik.

One example of a management list ML created when the sort instruction is "INK QTY (TOTAL)" is a sorted list ML3 illustrated in FIG. 7D. In this sorted list ML3, the seven printers set as the display targets are sorted according to conditions (1) to (4) described above. Shaded items in the sorted list ML3 are items that were used as sorting keys.

On the other hand, if the management server 300 determines in S410 that the sort instruction is not "INK QTY (TOTAL)" (S410: NO), the management server 300 skips S415.

In S420 the management server 300 determines whether the modified sort instruction is the ink quantity of a specific color. The management server 300 determines that the sort instruction is the quantity of a specific color of ink Ik when the instruction is one of "C INK QTY," "M INK QTY," "Y INK QTY," or "K INK QTY." If the sort instruction is the quantity of a specific color of ink Ik (S420: YES), in S425 the management server 300 sorts the printers set as display targets on the basis of the residual state and the remaining printing days RD for the specified color of ink Ik. More specifically, the management server 300 sorts the printers set as the display targets such that the priority of the printers satisfying conditions (A) to (D) given below is set higher in alphabetical order of the conditions (A) to (D). In conditions (A) to (D), the specific color of ink Ik is the color specified in the sort instruction. For example, when the sort instruction is "C INK QTY," the specific color of ink Ik is the C (cyan) ink Ik. When the sort instruction is "Y INK QTY," the specific color of ink Ik is the Y (yellow) ink Ik. The conditions (A) to (D) are as follows:

(A) Printers having a residual state set to the third residual condition S3 or the sixth residual condition S6 for the specific color of ink Ik, i.e., printers whose residual state for the specific color of ink Ik is "OUT";

(B) Printers having a residual state set to the second residual condition S2 for the specific color of ink Ik, i.e., printers whose residual state for the specific color of ink Ik is "LOW" and whose supply system is a "double-chamber supply system";

(C) Printers having a residual state set to the fifth residual condition S5 for the specific color of ink Ik, i.e., printers whose residual state for the specific color of ink Ik is "LOW" and whose supply system is a "single-chamber supply system"; and (D) Printers having a residual state set to either the first residual condition S or the fourth residual condition S4 for the specific color of ink Ik, i.e., printers whose residual state for the specific color of ink Ik is "NORMAL".

When a plurality of printers satisfies condition (B), the printers satisfying condition (B) are sorted in order of smallest number of remaining printing days RD for the specific color of ink Ik. The same sorting method is used when a plurality of printers satisfies condition (C) or (D).

On the other hand, if the sort condition is not the quantity of a specific color of ink Ik (S420: NO), the management server 300 skips S425.

In S430 the management server 300 determines whether the modified sort instruction is "-". When the sort instruction is "-" (S430: YES), in S435 the management server 300 sorts the printers set as display targets according to the initial order described above. In this case, the printers set as display targets are sorted in the same order used in the initial list ML0.

If the sort instruction is not "-" (S430: NO), the management server 300 skips S435 and ends the sorting process.

FIGS. 10A through 10C are second drawings illustrating examples of management lists ML according to the first embodiment. FIG. 10A illustrates a different example of the initial list ML0. The residual states of ink Ik and the numbers of remaining printing days RD for some of the printers in the initial list ML0 of FIG. 10A have been modified from those in the initial list ML0 of FIG. 7A for purposes of this description.

One example in FIGS. 10A through 10C of a management list ML created when the sort instruction is "C INK QTY" is a sorted list ML4 illustrated in FIG. 10B. As is clear from the shaded items in the sorted list ML4, the seven printers having model names Dev_1 through Dev_7 were sorted on the basis of the conditions (A) to (D) described above with C ink Ik set as the specific color of ink Ik.

Another example of a management list ML in FIGS. 10A through 10C created when the sort instruction is "Y INK QTY" is a sorted list ML5 illustrated in FIG. 10C. As indicated by the shaded items in the sorted list ML5, the seven printers having model names Dev_1 through Dev_7 were sorted on the basis of the conditions (A) to (D) described above with Y ink Ik set as the specific color of ink Ik.

In the filtering process (FIG. 8) according to the embodiment described above, the management server 300 identifies one or more printers among the printers under management that belong to the order group as display targets (S340 in FIG. 8). As described above, the order group includes printers employing double-chamber supply systems and having a residual state set to the second residual condition S2, and printers employing single-chamber supply systems and having a residual state set to the fifth residual condition S5. The order group is configured of a group of printers for which replacement cartridges must be prepared (ordered, for example). In the filtering process according to the embodiment described above, the management server 300 also identifies one or more printers among the printers under management that belong to the replace group as display targets (S360 in FIG. 8). As described above, the replace group includes printers employing double-chamber supply systems and having a residual state set to the second residual condition S2, printers employing double-chamber supply systems and having a residual state set to the third residual condition S3, and printers employing single-chamber supply systems and having a residual state set to the sixth residual condition S6. The replace group is configured of a group of printers having ink cartridges that must be replaced. The management server 300 separately outputs information for printers belonging to the order group, and information for printers belonging to the replace group (S370 of FIG. 8, S240 of FIG. 6).

As described above, when the residual state of ink Ik in the printer 100A employing a double-chamber supply system is the second residual condition S2, the printer 100A can continue printing since ink Ik remains in the intermediate tank 175A though not in the ink cartridge 200A. Thus, when a printer employing a double-chamber supply system is in this state, a replacement cartridge must be prepared, and the ink cartridge should be replaced since replacing the ink cartridge will not waste any ink Ik. For this reason, printers employing a double-chamber supply system and having a residual state set to the second residual condition S2 are identified both as printers belonging to the order group and printers belonging to the replace group in the present embodiment (S340 and S360 in FIG. 8). Hence, this method can facilitate the user in seeing which of a plurality of printers that include printers with double-chamber supply systems and printers with single-chamber supply systems are printers for which replacement cartridges must be prepared, and printers in which ink cartridges must be replaced, thereby facilitating the management of ink Ik in the printers.

More specifically, when the management server 300 acquires the filter instruction "ORDER" (S330: YES in FIG. 8), the management server 300 displays information on printers belonging to the order group (S370 in FIG. 8, S240 in FIG. 6, FIG. 7B). When the management server 300 acquires the filter instruction "REPLACE" (S350: YES in FIG. 8), the management server 300 displays information on printers belonging to the replace group (S370 in FIG. 8, S240 in FIG. 6, FIG. 7C). Thus, the management server 300 can accurately differentiate and display information on printers for which replacement cartridges must be prepared, and information on printers in which ink cartridges must be replaced in response to instructions from the user. For example, by inputting the filter instruction "ORDER," the user of the management server 300 can easily see which printers need to have replacement cartridges prepared and can easily order replacement cartridges for those printers. Once the user acquires the replacement cartridges, the user can input the filter instruction "REPLACE" to easily see which of the printers need ink cartridges to be replaced and can easily replace the ink cartridges.

In the sorting process of FIG. 9 according to the embodiment described above, the management server 300 sorts a plurality of printers on the basis of the residual state of ink Ik in the printers under management and displays a management list ML providing information on the sorted printers (S415 and S425 in FIG. 9, FIGS. 7D, 10B, and 10C). In other words, the management server 300 sets an order of priority for the printers under management on the basis of the residual states of ink Ik in those printers and displays information on printers as display targets according to this order of priority. Thus, the management server 300 can accurately display information on a plurality of printers according to an order of priority.

Specifically, when sorting printers according to the above conditions (1) to (4), the management server 300 gives printers that satisfy condition (2) higher priority than printers that satisfy condition (3). Similarly, when sorting printers according to the above conditions (A) to (D), the management server 300 gives printers that satisfy condition (B) higher priority than printers that satisfy condition (C). In other words, the management server 300 sets the priority for printers having double-chamber supply systems and a residual state in the second residual condition S2 higher than the priority for printers having a single-chamber supply system and a residual state in the fifth residual condition S5. As described above, the ink cartridge 200A for the printer 100A employing a double-chamber supply system can be replaced at any time without wasting ink Ik when the residual state of the ink Ik is the second residual condition S2. On the other hand, ink Ik still remains in the ink cartridge 200C of the printer 100C employing a single-chamber supply system when the residual state of the ink Ik is in the fifth residual condition S5. Consequently, ink Ik would be wasted if the ink cartridge 200C were replaced in this state. By setting the priority for printers having double-chamber supply systems and a residual state in the second residual condition S2 higher than the priority for printers employing single-chamber supply systems and having a residual state in the fifth residual condition S5 as described above, information on printers for which replacing an ink cartridge would not waste ink Ik is displayed with higher priority than information on printers whose cartridge replacement would waste ink Ik. Displaying the printers in this order of priority increases the probability that ink cartridges will be replaced without wasting ink Ik.

As described above, the management server 300 also sorts a plurality of printers that satisfy condition (2) or condition (B) while giving higher priority to printers having a smaller number of remaining printing days RD. In other words, the management server 300 sets a higher priority for printers having double-chamber supply systems and a residual state set to the second residual condition S2 when the number of the remaining printing days RD is smaller. Here, the need to order and replace ink cartridges in printers having double-chamber supply systems and a residual state set to the second residual condition S2 is, assuming that the average quantity of ink Ik consumed per day for each of the printers is equal, greater when the quantity of ink Ik corresponding to the remaining printing days RD, i.e., the quantity of ink Ik in the intermediate tank 175A, is lower. According to the embodiment described above, information on printers having a lower quantity of ink Ik in the intermediate tank 175A (having a smaller number of remaining printing days RD) is displayed with greater priority. This priority increases the probability that the ink cartridges will be properly replaced so as to avoid a condition in which printing cannot be continued.

The management server 300 also sorts a plurality of printers that satisfy condition (3) or condition (C) while giving higher priority to those printers having a smaller number of remaining printing days RD. In other words, the management server 300 sets the priority for printers having a single-chamber supply system and a residual state set to the fifth residual condition S5 higher when the number of the remaining printing days RD is smaller. The need for ordering ink cartridges in printers having single-chamber supply systems and a residual state set to the fifth residual condition S5 is, assuming that the average quantity of ink Ik consumed per day for each of the printers is equal, greater when the quantity of ink Ik corresponding to the remaining printing days RD, i.e., the quantity of ink Ik in the ink cartridge 200C, is smaller because printing cannot be continued if the ink cartridge 200C runs out of ink Ik. In the embodiment described above, the management server 300 gives greater priority to displaying information on printers having a smaller quantity of ink Ik in the ink cartridge 200C (having a smaller number of remaining printing days RD). This order can increase the probability that the ink cartridges will be replaced properly so as to avoid a situation in which printing cannot be continued.

As can be understood from the above description, a printer employing a double-chamber supply system in the present embodiment is an example of the first printing device of the present disclosure, and a printer employing a single-chamber supply system in the present embodiment is an example of the second printing device of the present disclosure. The order group is an example of the first group of the present disclosure, and the replace group is an example of the second group of the present disclosure.

B. Second Embodiment

The second embodiment differs from the first embodiment described above in the method of sorting used in S420 of the sorting process in FIG. 9. In S420 of the second embodiment, the management server 300 sorts printers as display targets so that printers satisfying conditions (A2) to (E2) described below are given higher priority in alphabetical order of the conditions (A2) to (E2). As in the first embodiment, the specific color of ink Ik used in conditions (A2) to (E2) is the color of ink Ik specified in the sort instruction. The conditions (A2) to (E2) are as follows:

(A2) Printers satisfying condition (A) in the first embodiment;

(B2) Printers among those printers satisfying condition (B) in the first embodiment and those printers satisfying condition (C) in the first embodiment whose number of remaining printing days RD for the specific color of ink Ik is less than or equal to a prescribed reference number of days TD (two days in the present embodiment), i.e., printers whose residual state for the specific color of ink Ik is "LOW" and whose number of remaining printing days RD for the specific color of ink Ik is less than or equal to the reference number of days TD;

(C2) Printers among those printers satisfying condition (B) in the first embodiment whose number of remaining printing days RD for the specific color of ink Ik is greater than the prescribed reference number of days TD, i.e., printers whose residual state for the specific color of ink Ik is "LOW," whose supply system is "double-chamber supply system," and whose number of remaining printing days RD for the specific color of ink Ik is greater than the reference number of days TD;

(D2) Printers among those printers satisfying condition (C) in the first embodiment whose number of remaining printing days RD for the specific color of ink Ik is greater than the prescribed reference number of days TD, i.e., printers whose residual state for the specific color of ink Ik is "LOW," whose supply system is "single-chamber supply system," and whose number of remaining printing days RD for the specific color of ink Ik is greater than the reference number of days TD; and (E2) Printers satisfying condition (D) in the first embodiment.

As in the first embodiment, when a plurality of printers satisfies condition (B2), the printers satisfying condition (B2) are sorted in order of the smallest number of remaining printing days RD for the specific color of ink Ik. The same sorting process is used when a plurality of printers satisfies any of conditions (C2) to (E2).

FIGS. 11A through 11C illustrate examples of management lists ML according to the second embodiment. FIG. 11A is an example of the initial list ML0 and is identical to the initial list ML0 in FIG. 10A.

One example in FIGS. 11A through 11C for a management list ML created when the sort instruction is "C INK QTY" is a sorted list ML6 illustrated in FIG. 11B. As indicated by the shaded items in the sorted list ML6, the seven printers having the model names Dev_1 through Dev_7 are sorted on the basis of conditions (A2) to (E2) described above with C ink Ik set as the specific color of ink Ik and two days set as the reference number of days TD.

Another example in FIGS. 11A through 11C of a management list ML created when the sort instruction is "Y INK QTY" is a sorted list ML7 illustrated in FIG. 11C. As indicated by the shaded items in the sorted list ML7, the seven printers having model names Dev_1 through Dev_7 are sorted on the basis of conditions (A2) to (E2) described above with Y ink Ik set as the specific color of ink Ik and two days set as the reference number of days TD.

According to the second embodiment described above, printers that satisfy condition (B2) are given a higher priority than printers that satisfy either of conditions (C2) or (D2). Therefore, printers whose remaining printing days RD for the specific color of ink Ik is less than or equal to the reference number of days TD among printers employing a double-chamber supply system and having a residual state set to the second residual condition S2 and printers employing a single-chamber supply system and having a residual state set to the fifth residual condition S5 are given a higher priority for a smaller number of remaining printing days RD, irrespective of the type of printer.

In addition, printers that satisfy condition (C2) are given a higher priority than printers that satisfy condition (D2). Therefore, printers whose remaining printing days RD for the specific color of ink Ik is greater than the reference number of days TD among printers employing a double-chamber supply system and having a residual state set to the second residual condition S2 and printers employing a single-chamber supply system and having a residual state set to the fifth residual condition S5 are ordered such that the priority of printers having a double-chamber supply system and a residual state set to the second residual condition S2 is higher than the priority of printers having a single-chamber supply system and a residual state set to the fifth residual condition S5.

When the number of remaining printing days RD is less than or equal to the reference number of days TD, the need to order a replacement cartridge is high regardless of whether the printer employs a double-chamber supply system or a single-chamber supply system. If there is a delay in ordering the replacement cartridge when the number of remaining printing days RD is less than or equal to the reference number of days TD, there is a strong possibility that the printer will run out of ink Ik and be unable to continue printing. On the other hand, if the remaining printing days RD is greater than the reference number of days TD, for printers employing a double-chamber supply system, the ink Ik can be replenished at any time without wasting any ink Ik, provided that the residual state of the ink Ik is set to the second residual condition S2. However, for printers employing a single-chamber supply system, ink Ik will be wasted if the ink cartridge is replaced too early when the residual state of ink Ik is set to the fifth residual condition S5. According to the second embodiment, printers whose remaining printing days RD for the specific color of ink Ik is less than or equal to the reference number of days TD are set to a higher priority for a smaller number of remaining printing days RD, regardless of the type of printer. This method suppresses delays in the ordering of replacement cartridges that can result in the printer running out of ink Ik and becoming unable to continue printing. For printers whose number of remaining printing days RD for the specific color of ink Ik is greater than the reference number of days TD, the priority of printers having a double-chamber supply system and a residual state set to the second residual condition S2 is set higher than the priority for printers having a single-chamber supply system and a residual state set to the fifth residual condition S5. This method increases the likelihood that the ink cartridges will be replaced without wasting ink Ik.

C. Variations of the Embodiments (1) In the embodiments described above, the management server 300 separately displays information on printers belonging to the order group and information on printers belonging to the replace group by displaying the order group list ML1 illustrated in FIG. 7B when the sort instruction is "ORDER" and by displaying the replace group list ML2 illustrated in FIG. 7C when the sort instruction is "REPLACE." As an alternative, the management server 300 may separately display information on printers belonging to the order group and information on printers belonging to the replace group by displaying the order group list ML1 and simultaneously displaying the replace group list ML2 separate from the order group list ML1.

FIG. 12 illustrates an example of a display screen WB according to this variation. The management server 300 may display the display screen WB in FIG. 12 on the display 340, for example. The display screen WB includes the order group list ML1, and the replace group list ML2 arranged separately from the order group list ML1. In this variation, the management server 300 can still properly separate and output information on printers belonging to the order group and information on printers belonging to the replace group.

(2) In the sorting process according to the embodiments (FIG. 9), the remaining printing days RD functioning as an index value for the residual quantity of ink Ik is used as a sorting key. As a variation, the residual ink volume RV may be used as a sorting key, or the ratio of the residual ink volume RV to the residual quantity of ink Ik when the ink cartridge is replaced (initial ink volume IV) may be used as a sorting key.

(3) In the embodiments described above, the remaining printing days RD is calculated by dividing the residual ink volume RV by the average quantity of ink consumed per day. As a variation, the remaining printing days RD may be acquired by identifying an approximation line showing the decline in residual ink volume RV, for example, based on the history in which the residual ink volume decreases with the passage of time and by identifying the date at which the residual ink volume RV becomes zero based on the approximation line. Here, the date at which the residual ink volume RV becomes zero may be identified with the assumption that the residual ink volume RV does not decline during periods in which the printer is not expected to be operating, such as on holidays or during the night.

(4) In the embodiments described above, the number of remaining printing days RD is calculated on each printer and the management server 300 acquires the numbers of remaining printing days RD from the printers. As a variation, the management server 300 may acquire the remaining printing days RD by calculating the remaining printing days RD using the residual ink volume RV periodically acquired from each printer.

(5) As an example of the printers under management in the embodiments described above, the printer 100A is provided with the printing mechanism 171A that prints color images using ink Ik in the colors C, M, Y, and K. However, the printers under management may be provided with a printing mechanism 171A that prints monochrome images using a single ink color (black (K), for example).

(6) As an example of the printers under management in the embodiments described above, the printer 100A is provided with an inkjet-type printing mechanism 171A. However, the printer 100A may instead be provided with a printing mechanism employing an electrophotographic system (laser system, for example) for printing images using toner as the printing agent. In this case, the print executing unit may be provided with a mounting portion in which a toner cartridge is mountable, a printing mechanism that executes printing operations using the tonner accommodated in the toner cartridge mounted in the mounting portion, and a tank (a sub tank for temporarily storing toner, for example) disposed along the path that toner travels from the toner cartridge mounted in the mounting portion to the printing mechanism. The present disclosure may be applied to this type of printer provided with a double-chamber supply system for supplying toner.

Similarly, the printer 100C may be provided with a printing mechanism employing an electrophotographic system (laser system, for example). In this case, the print executing unit of the printer 100C may be provided with a mounting portion in which a toner cartridge is mountable, a printing mechanism that executes printing operations using the toner accommodated in the toner cartridge mounted in the mounting portion, and a tank disposed along the path that toner travels from the toner cartridge mounted in the mounting portion to the printing mechanism. The present disclosure may be applied to this type of printer provided with a single-chamber supply system for supplying toner.

(7) In the embodiments and variations described above, the management lists ML in FIGS. 7A through 7D, 10A through 10C, 11A through 11C, and 12 are displayed on the display 340. As another variation, the management server 300 may execute the printer information display process in FIG. 6 when a start request is transmitted from the user's terminal device (a smartphone, for example) to the management server 300, and may output (transmit) screen data for displaying the management list ML to this terminal device in S270 of FIG. 6. In this case, the management list ML is displayed on a display of the user's terminal device.

(8) While the management server 300 is connected to the local area network NT in the present embodiments, the management server 300 may be connected to the internet instead. In this case, the printers 100A, 100B, and 100C under management periodically and automatically transmit printer information to the management server 300, for example. The management server 300 uses this printer information to execute the database updating process in FIG. 5 and the printer information display process in FIG. 6. In this case, the management server 300 may be a cloud server, for example, that includes a plurality of computers capable of communicating with each other over a network.

(9) In the embodiments described above, part of the configuration implemented in hardware may be replaced with software and, conversely, all or part of the configuration implemented in software may be replaced with hardware.

(10) When all or some of the functions of the present disclosure are implemented with computer programs, the programs may be stored on a computer-readable storage medium (a non-transitory computer readable storage medium, for example). The programs may be used on the same storage medium on which they were supplied or may be transferred to a different storage medium (a computer-readable storage medium). The "computer-readable storage medium" may be a portable storage medium, such as a memory card or a CD-ROM; an internal storage device built into the computer, such as any of various ROM or the like; or an external storage device, such as a hard disk drive, connected to the computer.

While the description has been made in detail with reference to specific embodiments and variations thereof, it would be apparent to those skilled in the art that various changes and modifications may be made thereto.

What is claimed is:

1. A communication device capable of communicating with a plurality of printing devices including a first printing device and a second printing device, the first printing device including: a first mounting portion in which a first cartridge accommodating printing agent is mounted; a tank configured to accommodate printing agent supplied from the first cartridge; and a first printing portion configured to execute printing operations using printing agent supplied from the tank, the second printing device including: a second mounting portion in which a second cartridge accommodating printing agent is mounted; and a second printing portion configured to execute printing operations using printing agent supplied from the second cartridge, the second printing device having no tank between the second mounting portion and the second printing portion, the communication device comprising a processor configured to perform:

acquiring a plurality of sets of device information on respective ones of the plurality of printing devices, the plurality of sets of device information including first device information corresponding to the first printing device and second device information corresponding to the second printing device, the first device information indicating a first residual state of printing agent in the first printing device, the first residual state being classified into a first condition, a second condition, and a third condition, the first condition indicating that the first cartridge and the tank accommodate printing agent, the second condition indicating that the first cartridge is out of printing agent while the tank accommodates printing agent greater than or equal to a first reference quantity, the third condition indicating that the first cartridge is out of printing agent and the tank accommodates printing agent less than the first reference quantity, the second device information indicating a second residual state of printing agent in the second printing device, the second residual state being classified into a fourth condition, a fifth condition, and a sixth condition, the fourth condition indicating that the second cartridge accommodates printing agent greater than or equal to a second reference quantity, the fifth condition indicating that the second cartridge accommodates printing agent less than the second reference quantity and greater than or equal to a third reference quantity smaller than the second reference quantity, the sixth condition indicating that the second cartridge accommodates printing agent less than the third reference quantity; and outputting device information of both the first printing device and the second printing device, based on the first residual state classified into the first condition, the second condition, and the third condition, and the second residual state classified into the fourth condition, the fifth condition, and the sixth condition.

2. The communication device according to claim 1, wherein, in the outputting, the device information of the first printing device in the second condition and the device information of the second printing device in the fifth condition are outputted in a distinguishable manner.

3. The communication device according to claim 2, wherein, in the outputting, the device information of the first printing device in the third condition and the device information of the second printing device in the sixth condition are outputted in a common manner.

4. The communication device according to claim 2, wherein, in the outputting, the device information of the first printing device in the second condition and the device information of the first printing device in the third condition are outputted in a common manner.

5. The communication device according to claim 1, wherein the processor is configured to further perform identifying a first group printing device belonging to a first group and a second group printing device belonging to a second group in accordance with the plurality of sets of device information, the first group printing device and the second group printing device being identified from among the plurality of printing devices.

6. The communication device according to claim 5, wherein the outputting includes outputting device information corresponding to the first group printing device and device information corresponding to the second group printing device in a distinguishable manner.

7. The communication device according to claim 5, wherein the identifying identifies the first printing device in the second condition and the second printing device in the fifth condition as the first group printing device, and identifies the first printing device in the second condition, the first printing device in the third condition, and the second printing device in the sixth condition as the second group printing device.

8. A non-transitory computer readable storage medium storing a set of program instructions installed on and executed by a computer capable of communicating with a plurality of printing devices including a first printing device and a second printing device, the first printing device including: a first mounting portion in which a first cartridge accommodating printing agent is mounted; a tank configured to accommodate printing agent supplied from the first cartridge; and a first printing portion configured to execute printing operations using printing agent supplied from the tank, the second printing device including: a second mounting portion in which a second cartridge accommodating printing agent is mounted; and a second printing portion configured to execute printing operations using printing agent supplied from the second cartridge, the second printing device having no tank between the second mounting portion and the second printing portion, the set of program instructions comprising:

acquiring a plurality of sets of device information on respective ones of the plurality of printing devices, the plurality of sets of device information including first device information corresponding to the first printing device and second device information corresponding to the second printing device, the first device information indicating a first residual state of printing agent in the first printing device, the first residual state being classified into a first condition, a second condition, and a third condition, the first condition indicating that the first cartridge and the tank accommodate printing agent, the second condition indicating that the first cartridge is out of printing agent while the tank accommodates printing agent greater than or equal to a first reference quantity, the third condition indicating that the first cartridge is out of printing agent and the tank accommodates printing agent less than the first reference quantity, the second device information indicating a second residual state of printing agent in the second printing device, the second residual state being classified into a fourth condition, a fifth condition, and a sixth condition, the fourth condition indicating that the second cartridge accommodates printing agent greater than or equal to a second reference quantity, the fifth condition indicating that the second cartridge accommodates printing agent less than the second reference quantity and greater than or equal to a third reference quantity smaller than the second reference quantity, the sixth condition indicating that the second cartridge accommodates printing agent less than the third reference quantity; and outputting device information of both the first printing device and the second printing device, based on the first residual state classified into the first condition, the second condition, and the third condition, and the second residual state classified into the fourth condition, the fifth condition, and the sixth condition.

9. The non-transitory computer readable storage medium according to claim 8, wherein, in the outputting, the device information of the first printing device in the second condition and the device information of the second printing device in the fifth condition are outputted in a distinguishable manner.

10. The non-transitory computer readable storage medium according to claim 9, wherein, in the outputting, the device information of the first printing device in the third condition and the device information of the second printing device in the sixth condition are outputted in a common manner.

11. The non-transitory computer readable storage medium according to claim 9, wherein, in the outputting, the device information of the first printing device in the second condition and the device information of the first printing device in the third condition are outputted in a common manner.

12. The non-transitory computer readable storage medium according to claim 8, wherein the set of program instructions further comprises identifying a first group printing device belonging to a first group and a second group printing device belonging to a second group in accordance with the plurality of sets of device information, the first group printing device and the second group printing device being identified from among the plurality of printing devices.

13. The non-transitory computer readable storage medium according to claim 12, wherein the outputting includes outputting device information corresponding to the first group printing device and device information corresponding to the second group printing device in a distinguishable manner.

14. The non-transitory computer readable storage medium according to claim 12, wherein the identifying identifies the first printing device in the second condition and the second printing device in the fifth condition as the first group printing device, and identifies the first printing device in the second condition, the first printing device in the third condition, and the second printing device in the sixth condition as the second group printing device.

\* \* \* \* \*